United States Patent
Pak et al.

(10) Patent No.: US 8,291,508 B2
(45) Date of Patent: Oct. 16, 2012

(54) METHOD AND SYSTEM FOR PROCESSING CONTENT

(75) Inventors: Koo-yong Pak, Seoul (KR); Sung Hyun Cho, Seoul (KR); Il gon Park, Seoul (KR); Man Soo Jeong, Seoul (KR); Min Gyu Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 12/295,868

(22) PCT Filed: Sep. 6, 2007

(86) PCT No.: PCT/KR2007/004317
§ 371 (c)(1),
(2), (4) Date: Oct. 3, 2008

(87) PCT Pub. No.: WO2008/030055
PCT Pub. Date: Mar. 13, 2008

(65) Prior Publication Data
US 2009/0293131 A1    Nov. 26, 2009

Related U.S. Application Data

(60) Provisional application No. 60/824,700, filed on Sep. 6, 2006, provisional application No. 60/825,647, filed on Sep. 14, 2006.

(30) Foreign Application Priority Data

Dec. 22, 2006    (KR) .................. 10-2006-0133204

(51) Int. Cl.
*G06F 7/04* (2006.01)
*G06F 17/30* (2006.01)
*G06F 21/00* (2006.01)
*H04N 7/16* (2011.01)
*G06F 15/16* (2006.01)

(52) U.S. Cl. ............ 726/29; 705/59; 709/227; 709/228; 709/229

(58) Field of Classification Search .......... 709/227–229; 726/29; 705/59
See application file for complete search history.

(56) References Cited

U.S. PATENT DOCUMENTS 5,708,812 A    1/1998    Van Dyke et al.
(Continued)

FOREIGN PATENT DOCUMENTS

CN    1405690 A    3/2003
(Continued)

OTHER PUBLICATIONS

U.S. Non Final Office Action issued in U.S. Appl. No. 12/346,487, dated Nov. 12, 2010, 32 pages.
(Continued)

*Primary Examiner* — Christian LaForgia
*(74) Attorney, Agent, or Firm* — Fish & Richardson P.C.

(57) ABSTRACT

A method and system for processing content are provided. The method of processing content includes: receiving source data from a first system; interoperable-processing the source data and generating a target data; and transmitting the target data to a second system, the first system or the second system include at least one of access control system, copy protection system and use control system. Accordingly, it is possible to easily process non-compliant content in the DRM interoperable system.

12 Claims, 8 Drawing Sheets

U.S. PATENT DOCUMENTS

| | | | |
|---|---|---|---|
| 5,774,668 A | 6/1998 | Choquier et al. | |
| 5,778,197 A | 7/1998 | Dunham | |
| 5,862,348 A | 1/1999 | Pedersen | |
| 5,903,566 A | 5/1999 | Flammer, III | |
| 5,991,876 A | 11/1999 | Johnson et al. | |
| 6,006,332 A | 12/1999 | Rabne et al. | |
| 6,044,075 A | 3/2000 | Le Boudec et al. | |
| 6,167,405 A | 12/2000 | Rosensteel et al. | |
| 6,226,618 B1 | 5/2001 | Downs et al. | |
| 6,230,281 B1 | 5/2001 | Brodfuhrer et al. | |
| 6,363,416 B1 | 3/2002 | Naeimi et al. | |
| 6,460,058 B2 | 10/2002 | Koppolu et al. | |
| 6,466,971 B1 | 10/2002 | Humpleman et al. | |
| 6,484,221 B1 | 11/2002 | Lorinser et al. | |
| 6,516,416 B2 | 2/2003 | Gregg et al. | |
| 6,519,656 B2 | 2/2003 | Kondo et al. | |
| 6,549,937 B1 | 4/2003 | Auerbach et al. | |
| 6,600,958 B1 | 7/2003 | Zondag | |
| 6,640,278 B1 | 10/2003 | Nolan et al. | |
| 6,665,521 B1 | 12/2003 | Gorday et al. | |
| 6,678,791 B1 | 1/2004 | Jacobs et al. | |
| 6,799,220 B1 | 9/2004 | Merritt et al. | |
| 6,807,542 B2 | 10/2004 | Bantz et al. | |
| 6,807,581 B1 | 10/2004 | Starr et al. | |
| 6,873,975 B1 | 3/2005 | Hatakeyama et al. | |
| 6,944,131 B2 | 9/2005 | Beshai et al. | |
| 6,954,436 B1 | 10/2005 | Yip et al. | |
| 6,993,587 B1 | 1/2006 | Basani et al. | |
| 7,016,963 B1 | 3/2006 | Judd | |
| 7,020,781 B1 | 3/2006 | Saw et al. | |
| 7,032,003 B1 | 4/2006 | Shi et al. | |
| 7,036,011 B2 | 4/2006 | Grimes et al. | |
| 7,062,541 B1 | 6/2006 | Cannon et al. | |
| 7,076,568 B2 | 7/2006 | Philbrick et al. | |
| 7,184,988 B1 | 2/2007 | Frankel et al. | |
| 7,185,113 B1 | 2/2007 | Haberman et al. | |
| 7,213,269 B2 | 5/2007 | Orthlieb et al. | |
| 7,266,616 B1 | 9/2007 | Munshi et al. | |
| 7,421,578 B1 | 9/2008 | Huang et al. | |
| 7,461,130 B1 | 12/2008 | AbdelAziz et al. | |
| 7,484,058 B2 | 1/2009 | Frey et al. | |
| 7,512,973 B1 | 3/2009 | Chan et al. | |
| 7,543,140 B2 | 6/2009 | Dillaway et al. | |
| 7,546,641 B2 * | 6/2009 | Robert et al. | 726/30 |
| 7,549,062 B2 | 6/2009 | Kouznetsov et al. | |
| 7,555,464 B2 * | 6/2009 | Candelore | 705/59 |
| 7,565,438 B1 | 7/2009 | Zhu | |
| 7,577,999 B2 | 8/2009 | Narin et al. | |
| 7,590,856 B2 * | 9/2009 | Morino et al. | 713/182 |
| 7,624,072 B2 | 11/2009 | Lipsky et al. | |
| 7,664,883 B2 | 2/2010 | Craft et al. | |
| 7,673,008 B2 | 3/2010 | Kojima | |
| 7,680,963 B2 | 3/2010 | Go et al. | |
| 7,720,767 B2 * | 5/2010 | Ta et al. | 705/59 |
| 7,721,111 B2 * | 5/2010 | Hug et al. | 713/189 |
| 7,733,860 B2 | 6/2010 | Coffell et al. | |
| 7,757,299 B2 * | 7/2010 | Robert et al. | 726/30 |
| 7,845,014 B2 * | 11/2010 | Siegel | 726/29 |
| 7,877,598 B2 | 1/2011 | Schmidt et al. | |
| 8,046,381 B2 | 10/2011 | Cai et al. | |
| 8,117,342 B2 | 2/2012 | Heredia et al. | |
| 2001/0007993 A1 | 7/2001 | Wu | |
| 2001/0027479 A1 | 10/2001 | Delaney et al. | |
| 2001/0037406 A1 | 11/2001 | Philbrick et al. | |
| 2001/0052033 A1 | 12/2001 | Bermudez et al. | |
| 2002/0002688 A1 | 1/2002 | Gregg et al. | |
| 2002/0091850 A1 | 7/2002 | Perholtz et al. | |
| 2002/0108050 A1 | 8/2002 | Raley et al. | |
| 2002/0120577 A1 | 8/2002 | Hans et al. | |
| 2002/0143855 A1 | 10/2002 | Traversat et al. | |
| 2002/0144108 A1 | 10/2002 | Benantar | |
| 2002/0144119 A1 | 10/2002 | Benantar | |
| 2002/0157002 A1 | 10/2002 | Messerges | |
| 2002/0184515 A1 | 12/2002 | Oho et al. | |
| 2002/0198845 A1 | 12/2002 | Lao | |
| 2003/0041138 A1 | 2/2003 | Kampe | |
| 2003/0078891 A1 | 4/2003 | Capitant | |
| 2003/0095540 A1 | 5/2003 | Mulligan et al. | |
| 2003/0114163 A1 | 6/2003 | Bickle et al. | |
| 2003/0120840 A1 | 6/2003 | Isozu | |
| 2003/0126086 A1 | 7/2003 | Safadi | |
| 2003/0189947 A1 | 10/2003 | Beshai | |
| 2003/0221014 A1 | 11/2003 | Kosiba et al. | |
| 2003/0225956 A1 | 12/2003 | Riley et al. | |
| 2004/0003269 A1 | 1/2004 | Waxman et al. | |
| 2004/0003270 A1 | 1/2004 | Bourne et al. | |
| 2004/0057448 A1 | 3/2004 | Nakamura | |
| 2004/0062246 A1 | 4/2004 | Boucher et al. | |
| 2004/0088541 A1 | 5/2004 | Messerges et al. | |
| 2004/0117660 A1 | 6/2004 | Karaoguz et al. | |
| 2004/0128345 A1 | 7/2004 | Robinson et al. | |
| 2004/0151130 A1 | 8/2004 | Beshai et al. | |
| 2004/0158712 A1 * | 8/2004 | Lee et al. | 713/165 |
| 2004/0158731 A1 | 8/2004 | Narin et al. | |
| 2004/0168077 A1 | 8/2004 | Waxman et al. | |
| 2004/0170046 A1 | 9/2004 | Belnet et al. | |
| 2004/0172533 A1 | 9/2004 | DeMello et al. | |
| 2004/0174817 A1 | 9/2004 | Jabri et al. | |
| 2004/0230982 A1 | 11/2004 | Wookey | |
| 2004/0236717 A1 | 11/2004 | Demartini et al. | |
| 2004/0248561 A1 | 12/2004 | Nykanen et al. | |
| 2004/0249943 A1 | 12/2004 | Punaganti et al. | |
| 2004/0254993 A1 | 12/2004 | Mamas | |
| 2005/0003806 A1 | 1/2005 | Bazin et al. | |
| 2005/0021556 A1 | 1/2005 | Noguchi et al. | |
| 2005/0022033 A1 | 1/2005 | Han | |
| 2005/0033893 A1 | 2/2005 | Pettey et al. | |
| 2005/0044391 A1 | 2/2005 | Noguchi et al. | |
| 2005/0054447 A1 | 3/2005 | Hiroyama et al. | |
| 2005/0055418 A1 | 3/2005 | Blanc et al. | |
| 2005/0065891 A1 | 3/2005 | Lee et al. | |
| 2005/0091507 A1 | 4/2005 | Lee et al. | |
| 2005/0102513 A1 | 5/2005 | Alve | |
| 2005/0144468 A1 | 6/2005 | Northcutt et al. | |
| 2005/0172045 A1 | 8/2005 | Bermudez et al. | |
| 2005/0182727 A1 | 8/2005 | Robert et al. | |
| 2005/0198150 A1 | 9/2005 | Werner | |
| 2005/0198359 A1 | 9/2005 | Basani et al. | |
| 2005/0201301 A1 | 9/2005 | Bridgelall | |
| 2005/0223415 A1 | 10/2005 | Oho et al. | |
| 2005/0225530 A1 | 10/2005 | Evans et al. | |
| 2005/0228858 A1 | 10/2005 | Mizutani et al. | |
| 2005/0243777 A1 | 11/2005 | Fong | |
| 2005/0265555 A1 | 12/2005 | Pippuri | |
| 2005/0267845 A1 | 12/2005 | Oh | |
| 2005/0268090 A1 | 12/2005 | Saw et al. | |
| 2005/0268343 A1 | 12/2005 | Onoda et al. | |
| 2005/0273399 A1 | 12/2005 | Soma et al. | |
| 2005/0289076 A1 | 12/2005 | Lambert | |
| 2006/0013158 A1 | 1/2006 | Ahuja et al. | |
| 2006/0015502 A1 | 1/2006 | Szucs | |
| 2006/0026691 A1 * | 2/2006 | Kim et al. | 726/27 |
| 2006/0047775 A1 | 3/2006 | Bruck et al. | |
| 2006/0080529 A1 | 4/2006 | Yoon et al. | |
| 2006/0083369 A1 | 4/2006 | Lee | |
| 2006/0088053 A1 | 4/2006 | Smith | |
| 2006/0133335 A1 | 6/2006 | Garcia-Martin | |
| 2006/0143133 A1 | 6/2006 | Medvinsky | |
| 2006/0168451 A1 | 7/2006 | Ishibashi et al. | |
| 2006/0190403 A1 | 8/2006 | Lin et al. | |
| 2006/0190521 A1 | 8/2006 | Kojima | |
| 2006/0195864 A1 | 8/2006 | New et al. | |
| 2006/0218419 A1 | 9/2006 | Iwamura et al. | |
| 2006/0267845 A1 | 11/2006 | Takei et al. | |
| 2006/0272026 A1 | 11/2006 | Niwano et al. | |
| 2006/0282391 A1 | 12/2006 | Peterka et al. | |
| 2007/0027814 A1 * | 2/2007 | Tuoriniemi | 705/59 |
| 2007/0078777 A1 | 4/2007 | Demartini et al. | |
| 2007/0079010 A1 | 4/2007 | Heredia et al. | |
| 2007/0083610 A1 | 4/2007 | Treder et al. | |
| 2007/0093255 A1 | 4/2007 | Nurminen et al. | |
| 2007/0094145 A1 * | 4/2007 | Ta et al. | 705/59 |
| 2007/0100701 A1 * | 5/2007 | Boccon-Gibod et al. | 705/21 |
| 2007/0156603 A1 * | 7/2007 | Yoon et al. | 705/59 |
| 2007/0172069 A1 | 7/2007 | Kim et al. | |
| 2007/0198656 A1 | 8/2007 | Mazzaferri et al. | |
| 2007/0208574 A1 | 9/2007 | Zheng et al. | |

| | | | |
|---|---|---|---|
| 2007/0220302 | A1 | 9/2007 | Cline et al. |
| 2007/0233891 | A1 | 10/2007 | Luby et al. |
| 2007/0234432 | A1 | 10/2007 | Korkishko et al. |
| 2007/0242821 | A1* | 10/2007 | Kim et al. .................... 380/28 |
| 2007/0255659 | A1* | 11/2007 | Yen et al. .................... 705/51 |
| 2007/0266198 | A1 | 11/2007 | Bousis |
| 2007/0269044 | A1 | 11/2007 | Bruestle |
| 2008/0120362 | A1 | 5/2008 | Kapoor et al. |
| 2008/0137528 | A1 | 6/2008 | O'Toole et al. |
| 2008/0181219 | A1 | 7/2008 | Chen et al. |
| 2008/0216177 | A1* | 9/2008 | Yokosato et al. ............. 726/26 |
| 2008/0229387 | A1* | 9/2008 | Baks et al. ................... 726/1 |
| 2008/0256351 | A1 | 10/2008 | Natarajan |
| 2008/0256368 | A1 | 10/2008 | Ross et al. |
| 2009/0190496 | A1 | 7/2009 | Mohamed-Rasheed et al. |
| 2009/0228988 | A1 | 9/2009 | Jeong et al. |
| 2009/0235330 | A1 | 9/2009 | Byun et al. |
| 2009/0248848 | A1 | 10/2009 | Jeong et al. |
| 2009/0265278 | A1 | 10/2009 | Wang et al. |
| 2009/0307387 | A1 | 12/2009 | Jeong et al. |
| 2010/0257370 | A1 | 10/2010 | Yoon et al. |

FOREIGN PATENT DOCUMENTS

| | | |
|---|---|---|
| CN | 1469583 | 1/2004 |
| CN | 1610914 A | 4/2005 |
| EP | 1748598 | 1/2007 |
| EP | 1564621 B1 | 9/2009 |
| JP | 08-202568 | 8/1996 |
| JP | 09-149435 | 6/1997 |
| JP | 2000-276424 | 10/2000 |
| JP | 2001-117809 | 4/2001 |
| JP | 2001/285283 | 10/2001 |
| JP | 2002/033724 | 1/2002 |
| JP | 2002-099451 | 4/2002 |
| JP | 2002-152301 A | 5/2002 |
| JP | 2002-516652 | 6/2002 |
| JP | 2003-110556 | 4/2003 |
| JP | 2003-152820 | 5/2003 |
| JP | 2003-169091 | 6/2003 |
| JP | 2003-242124 | 8/2003 |
| JP | 2004-023327 | 1/2004 |
| JP | 2004-110816 | 4/2004 |
| JP | 2004-110817 | 4/2004 |
| JP | 2004-171544 | 6/2004 |
| JP | 2004-302817 | 12/2004 |
| JP | 2005-092872 | 4/2005 |
| JP | 2005-100030 | 4/2005 |
| JP | 2005-117631 | 4/2005 |
| JP | 2005-123686 | 5/2005 |
| JP | 2005-129058 | 5/2005 |
| JP | 2005-514716 | 5/2005 |
| JP | 2005-182145 | 7/2005 |
| JP | 2005-526330 | 9/2005 |
| JP | 2006/521713 | 9/2006 |
| JP | 2007-312328 | 11/2007 |
| KR | 2004034165 A | 4/2004 |
| KR | 10-2005-0039522 | 4/2005 |
| KR | 2005032856 A | 4/2005 |
| KR | 2005037483 A | 4/2005 |
| KR | 2005077881 A | 8/2005 |
| KR | 2005101940 A | 10/2005 |
| KR | 2005104182 A | 11/2005 |
| KR | 2005120579 A | 12/2005 |
| KR | 2006011763 A | 2/2006 |
| RU | 2260918 C2 | 9/2005 |
| RU | 2265961 C2 | 12/2005 |
| WO | WO0250787 A1 | 6/2002 |
| WO | WO03036441 A2 | 5/2003 |
| WO | WO03034313 A3 | 7/2003 |
| WO | WO03058620 A2 | 7/2003 |
| WO | WO03073760 A1 | 9/2003 |
| WO | WO03107602 A1 | 12/2003 |
| WO | 2004/057872 | 7/2004 |
| WO | WO 2004/102459 A1 * | 11/2004 |
| WO | WO2004102459 A1 | 11/2004 |
| WO | WO 2005/010763 | 3/2005 |
| WO | WO2005034424 A1 | 4/2005 |
| WO | WO 2005 041001 A1 | 5/2005 |
| WO | WO2004059478 A3 | 8/2005 |
| WO | WO2004031950 A3 | 9/2005 |
| WO | 2005/101831 | 10/2005 |
| WO | WO 2006/011768 A1 | 2/2006 |
| WO | WO2006011768 A1 | 2/2006 |
| WO | 2006043784 A1 | 4/2006 |
| WO | WO 2006/092840 A1 * | 9/2006 |

OTHER PUBLICATIONS

Final Office Action dated Feb. 4, 2011 for U.S. Appl. No. 12/281,640, 8 pages.
Australian Office Action dated Nov. 23, 2010 for AU Patent Application No. 2007293790, 2 pages.
China Office Action dated Nov. 10, 2010 for Application No. 200880000253.1, with English translation, 11 pages.
U.S. Office Action dated Oct. 29, 2010 for U.S. Appl. No. 12/346,644, 13 pages.
U.S. Office Action dated Dec. 10, 2010 for U.S. Appl. No. 12/281,633, 17 pages.
U.S. Office Action dated Dec. 12, 21, 2010 for U.S. Appl. No. 12/281,638, 21 pages.
UPnP; "Universal Plug and Play Device Architecture"; Jun. 8, 2000; Microsoft Corporation; Version 1.0; pp. 1-54.
WAP; "WAP Push Architectural Overview"; Jul. 3, 2001; WAP Forum; pp. 1-24.
U.S. Office Action dated Dec. 30, 2010 for U.S. Appl. No. 12/298,912, 11 pages.
U.S. Notice of Allowance dated Jan. 24, 2011 for U.S. Appl. No. 12/347,426, 5 pages.
U.S. Office Action dated Feb. 3, 2011 for U.S. Appl. No. 12/281,648, 20 pages.
U.S. Non-final Office Action in U.S. Appl. No. 12/281,634 dated Sep. 20, 2010, 26 pages.
Russian Office Action in Application No. 2008145043 dated Aug. 18, 2010, with English translation, 14 pages.
U.S. Non-final Office Action in 12/347,426 dated Aug. 18, 2010, 21 pages.
Japanese Office Action dated Feb. 22, 2011 with English Translation, 4 pages.
Suresh Singh et al.; Electing Leaders Based Upon Performance: the Delay Model; IEEE; 2001; p. 464-471.
U.S. Final Office Action dated Mar. 2, 2011 for U.S. Appl. No. 12/281,634, 12 pages.
Russian Office Action in Application No. 2008145043/09 dated Apr. 30, 2010, with English translation, 7 pages.
U.S. Office Action dated Feb. 18, 2011 for U.S. Appl. No. 12/281,650, 12 pages.
U.S. Notice of Allowance dated Feb. 23, 2011 for U.S. Appl. No. 12/347,426, 9 pages.
U.S. Non-final Office Action dated Jun. 29, 2010 for U.S. Appl. No. 12/281,633, 25 pages.
European Office Action dated Aug. 23, 2011 for Appln. No. 08712540.7, 5 pages.
Final Office Action for U.S. Appl. No. 12/346,642 dated Sep. 15, 2011, 16 pages.
Office Action dated Mar. 18, 2011 for U.S. Appl. No. 12/346,642, 14 pages.
Final Office Action dated Mar. 23, 2011 for U.S. Appl. No. 12/346,487, 11 pages.
Final Office Action dated Mar. 23, 2011 for U.S. Appl. No. 12/346,345, 12 pages.
Final Office Action dated Apr. 1, 2011 for U.S. Appl. No. 12/281,638, 24 pages.
Office Action dated May 10, 2011 for U.S. Appl. No. 12/298,914, 23 pages.
Japanese Office Action dated Jun. 1, 2011 for application No. 2008-558198, 7 pages.
Non-final Office Action issued in U.S. Appl. No. 12/347,549 mailed Apr. 14, 2011, 14 pages.
Saxena et al., "Admission Control in Peer-to-Peer: Design and Performance Evaluation." 2003, ACM, SASN '03, pp. 1-11.
Japanese Office Action dated Jun. 1, 2011 for application No. 2009-537096, 5 pages.

Final Office Action dated Apr. 19, 2011 for U.S. Appl. No. 12/346,644, 10 pages.
Office Action issued in U.S. Appl. No. 12/346,668 mailed Apr. 5, 2011, 11 pages.
Office Action issued in U.S. Appl. No. 12/281,640 mailed Apr. 19, 2011, 9 pages.
Australian Office Action dated Apr. 21, 2011 for AU Patent Application No. 2007293790, 2 pages.
Japanese Office Action dated May 19, 2011 with English Translation, for application No. 2008-558196, 6 pages.
Chinese Office Action dated May 20, 2011 for Application No. 200780007181.9, with English translation, 7 pages.
Japanese Office Action dated May 19, 2011 with English Translation, for application No. 2008-558197, 4 pages.
Japanese Notice of Allowance dated Jun. 23, 2011 for application No. 2008-558201, 3 pages.
Japanese Office Action dated May 25, 2011 with English Translation, for application No. 2008-558202, 7 pages.
Tsunoda, S., "The emergence of Ubiquitous Era, Overall JAVA technology supporting ubiquitous," JAVA Press, Japan, Jun. 18, 2005, vol. 42, p. 225.
Final Office Action for U.S. Appl. No. 12/298,912 dated Aug. 1, 2011, 14 pages.
Final Office Action for U.S. Appl. No. 12/281,648 dated Aug. 4, 2011, 18 pages.
Office Action issued Jul. 26, 2011 in Japanese Patent Application No. 2009-527301, including English translation, 4 pages.
Non-final Office Action for U.S. Appl. No. 12/281,647 dated Oct. 14, 2011, 12 pages.
Office Action issued Oct. 18, 2011 in Japanese Patent Application No. 2008-558196, including English translation, 7 pages.
Office Action issued Oct. 18, 2011 in Japanese Patent Application No. 2008-558198, including English translation, 7 pages.
Katsuyasu, Sotoyama, et al., "Techno College TCP/IP Protocol Lectyure," Nikkei Network, No. 67, Japan, Nikkei Business Publications, Inc., Oct. 21, 2005, with English Translation, pp. 120-125.
Notice of Allowance issued Nov. 15, 2011 in Japanese Patent Application No. 2008-558200, with English Translation, 6 pages.
Final Office Action for U.S. Appl. No. 12/347,549 dated Nov. 22, 2011, 12 pages.
Non-final Office Action for U.S. Appl. No. 12/281,633 dated Nov. 25, 2011, 18 pages.
Office Action issued Oct. 26, 2011 in Japanese Patent Application No. 2009-534512, including English translation, 5 pages.
Office Action issued by USPTO on Feb. 2, 2012 for U.S. Appl. No. 12/346,487.
Office Action issued by the USPTO on Mar. 1, 2012 for U.S. Appl. No. 12/346,345.
Notice of Allowance issued by the USPTO on Mar. 21, 2012 for U.S. Appl. No. 12/281,638; 10 pages.
Office Action issued by the USPTO on Mar. 29, 2012 for corresponding U.S. Appl. No. 12/281,648; 9 pages.
Heileman et al; "DRM Interoperability Analysis from the Perspective of a Layered Framework"; In Proceedings of the 5th ACM Workshop on Digital rights management; pp. 17-26, Nov. 7, 2005.
Safavi-Naini et al; "Import/Export in Digital Rights Management*"; In Proceedings of the 4th ACM workshop on Digital rights management; pp. 99-110, 2004.
Notice of Allowance issued in Japanese Application No. 2008-558198 issued on Apr. 17, 2012, with English translation; 9 pages.
Office Action issued on May 18, 2012 for corresponding U.S. Appl. No. 12/346,644; 14 pages.
Office Action issued on May 25, 2012 for corresponding U.S. Appl. No. 12/281,647; 14 pages.
Notice of Allowance issued on Jun. 8, 2012 for U.S. Appl. No. 12/347,549; 10 pages.
Johnstone et al; "iXChange—A Self-Organising Super Peer Network Model"; 2005; ACM; in ISCC '05 Proceedings of the 10$^{th}$ IEEE Symposium.
Mandy et al; "Mobile AD Hoc Networks: A Hybrid Approach for Selection of Super Peers"; Mar. 2005; IEEE; In Proceedings of Second IFIP International Conference on Wireless and Optical Communications Networks 2005 (WOCN); pp. 280-284.
The ATM Forum; "Private Network-Network Interface (PNNI) Specification"; Mar. 1996; The ATM Forum; v 1.0; pp. 1-385.
Notice of Allowance issued by Japanese Patent Office on Jul. 3, 2012 for corresponding JP Patent Application No. 2008-558196.

* cited by examiner

[Fig. 1]
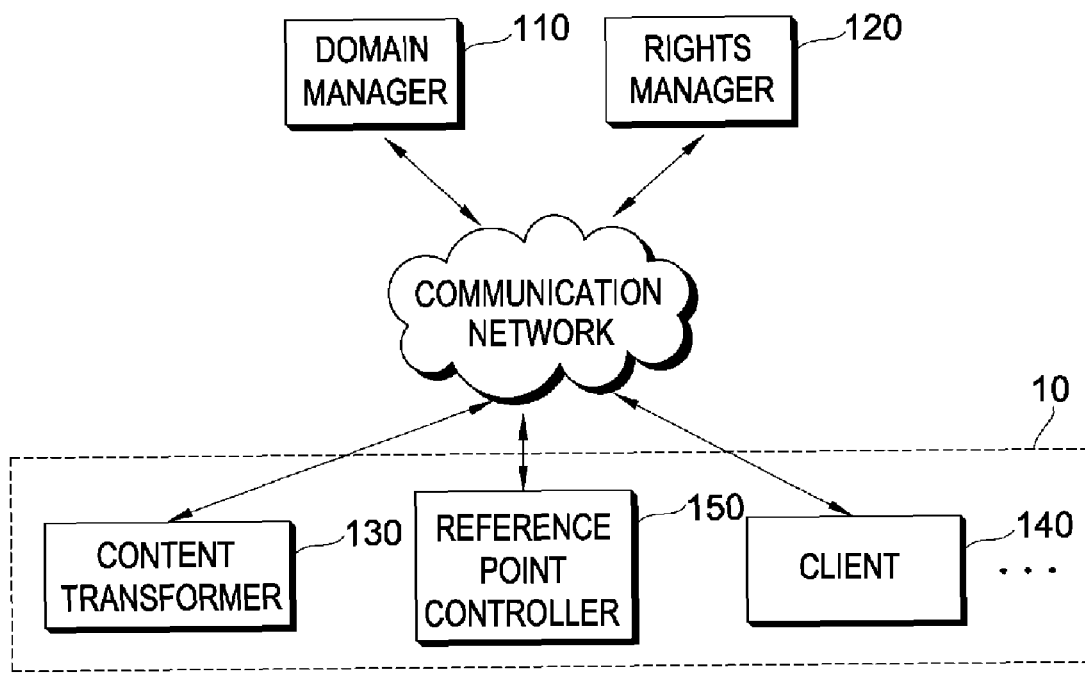
[Fig. 2]
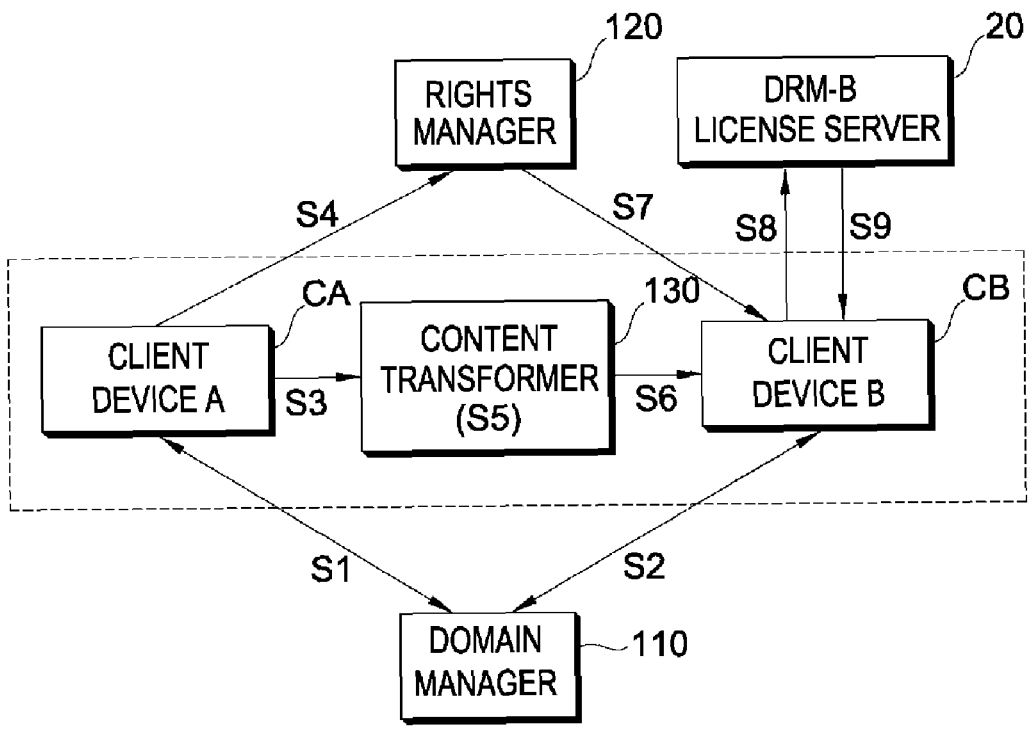

[Fig. 3]
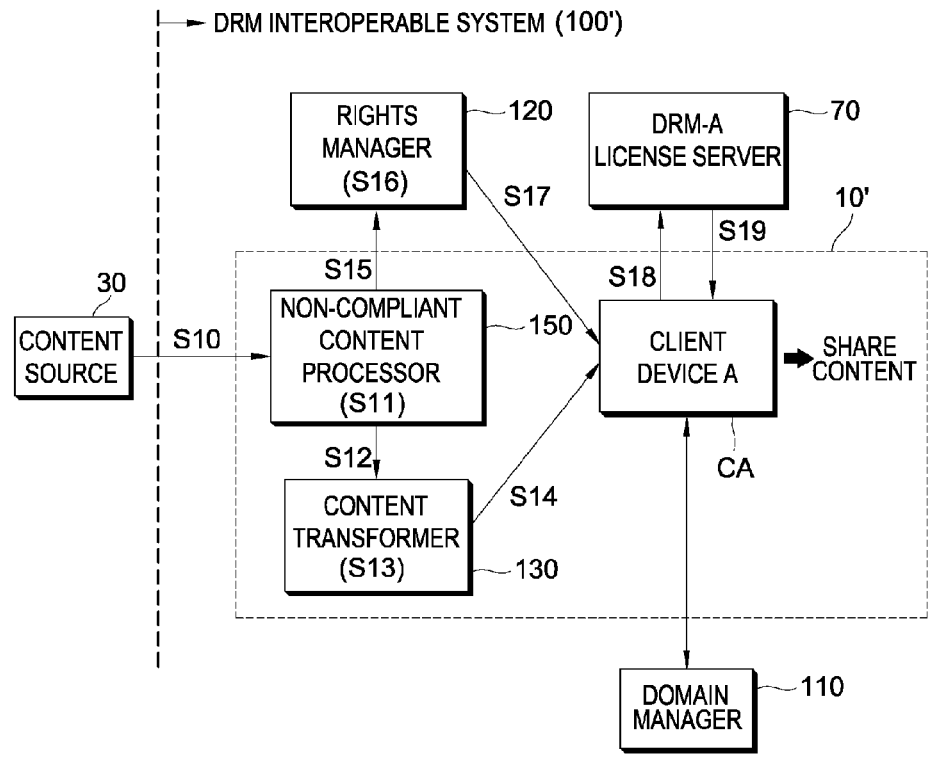
[Fig. 4]
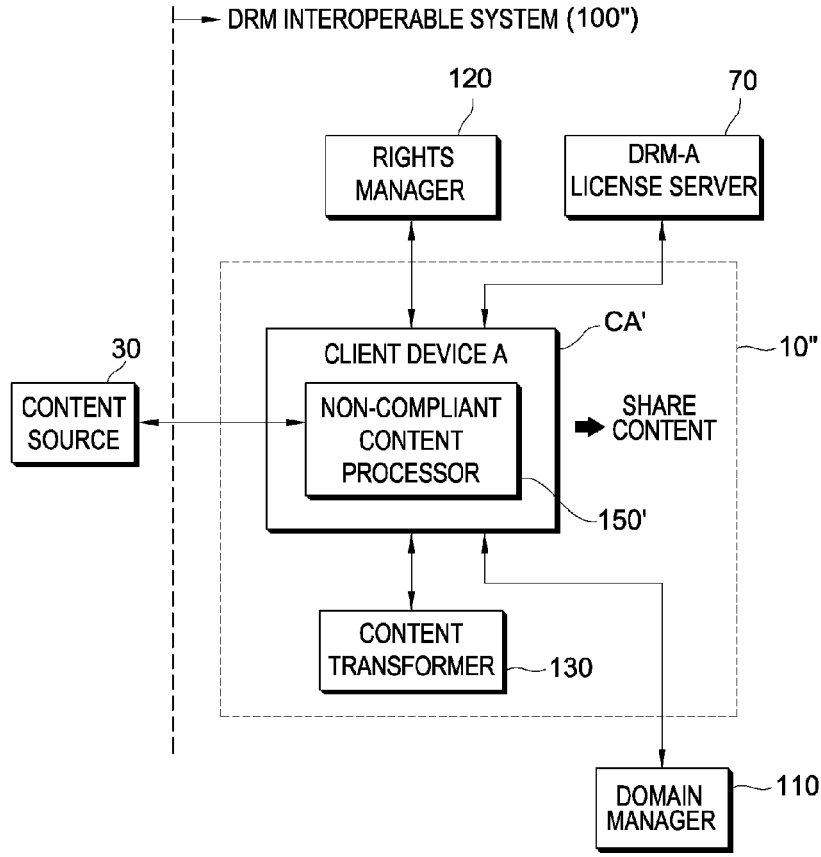

[Fig. 5]
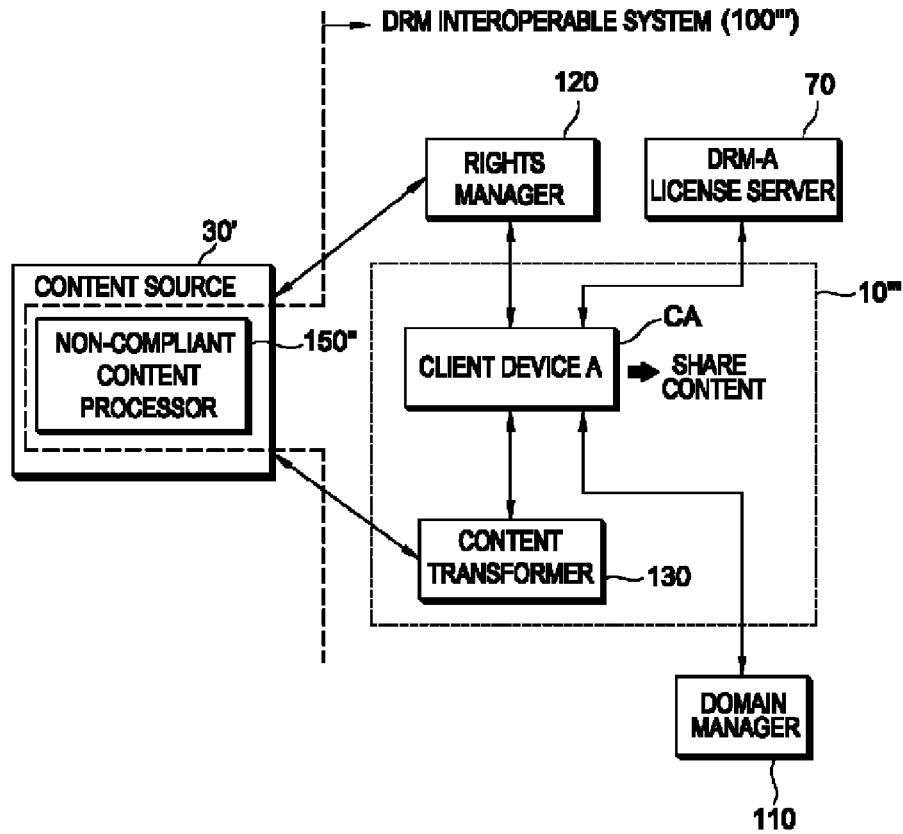
[Fig. 6]
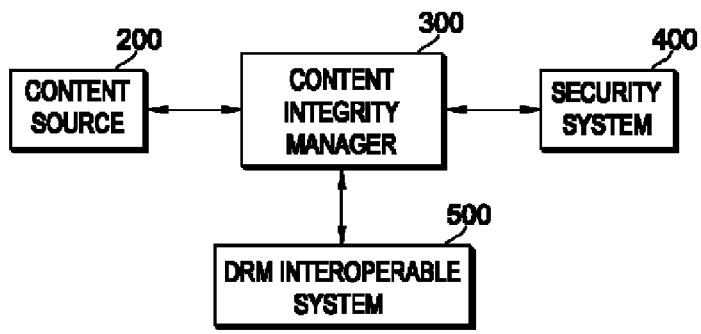
[Fig. 7]
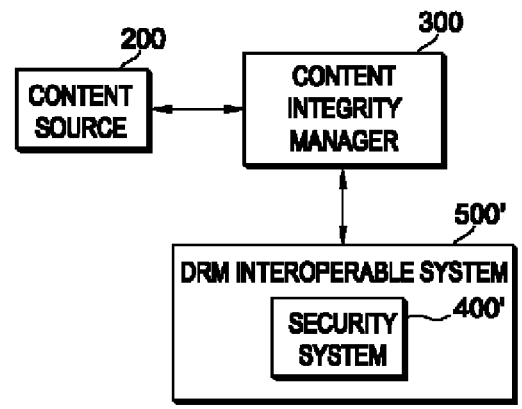

[Fig. 8]
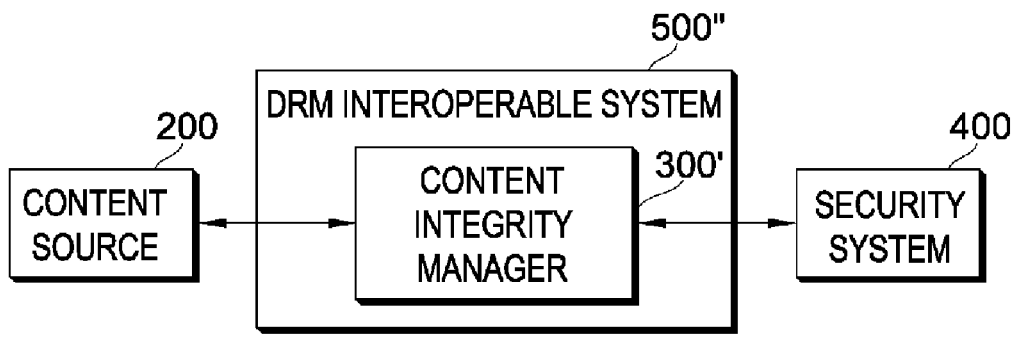
[Fig. 9]
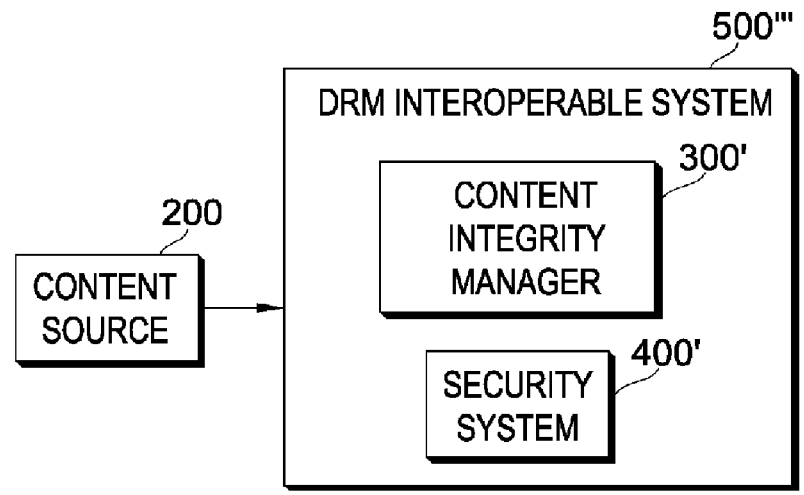
[Fig. 10]
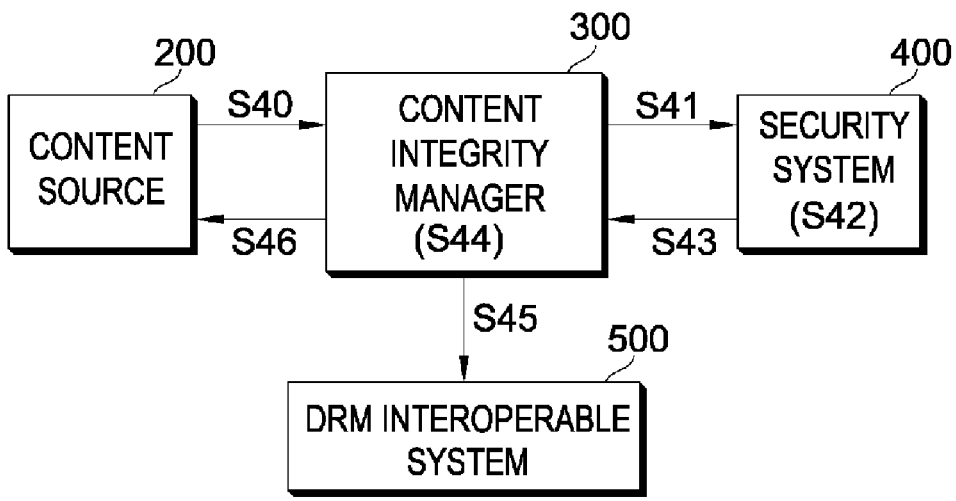

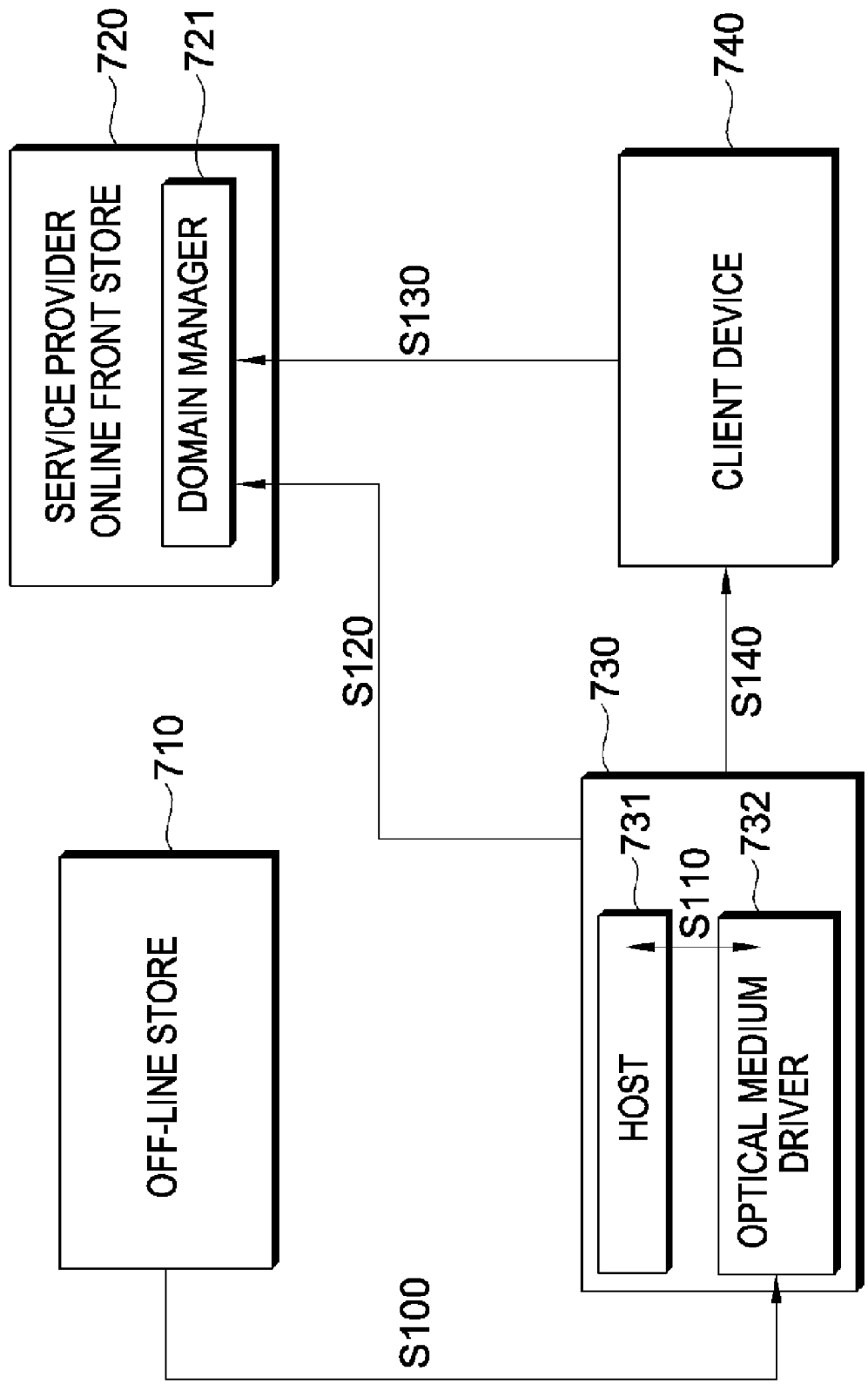

[Fig. 12]
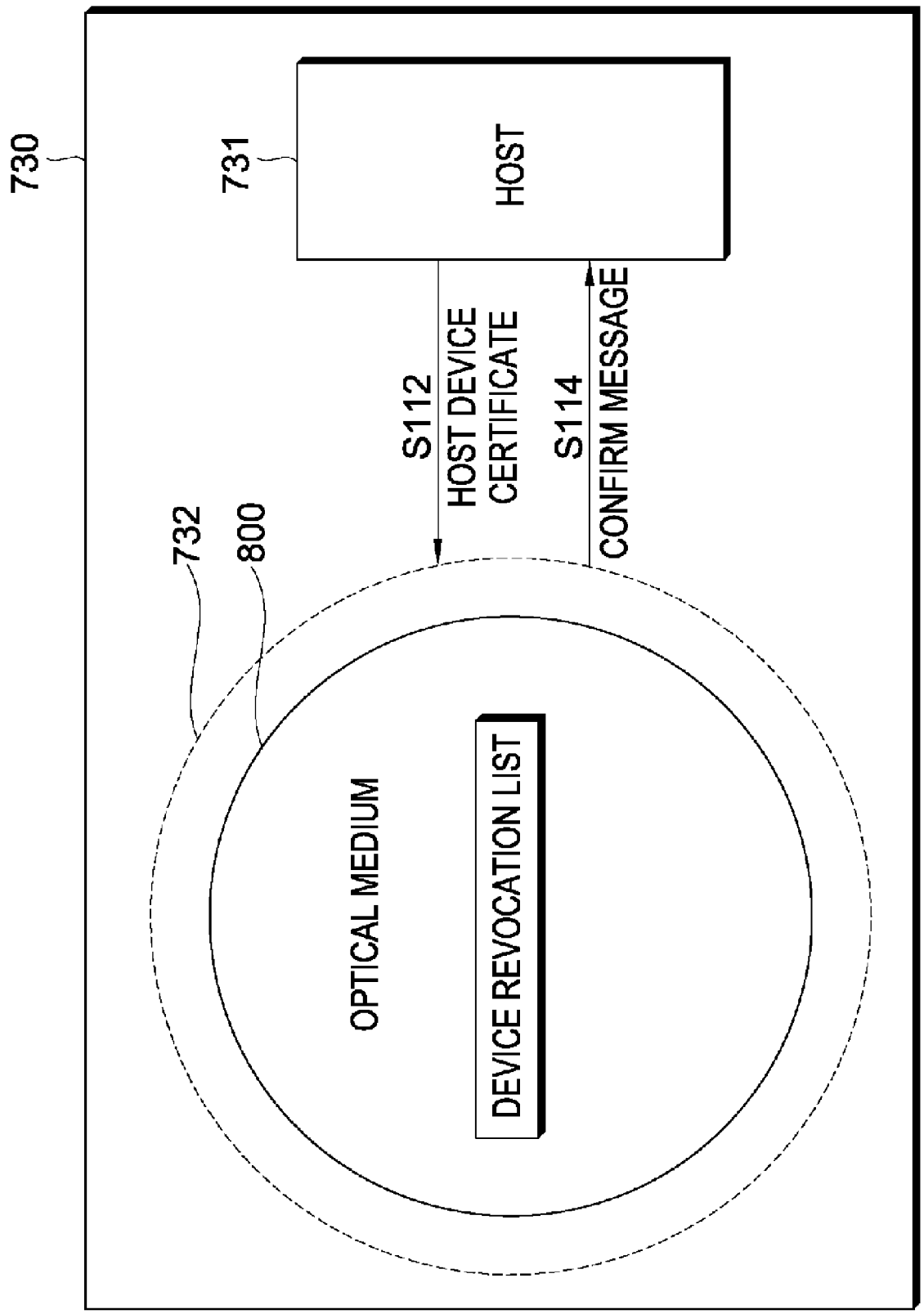

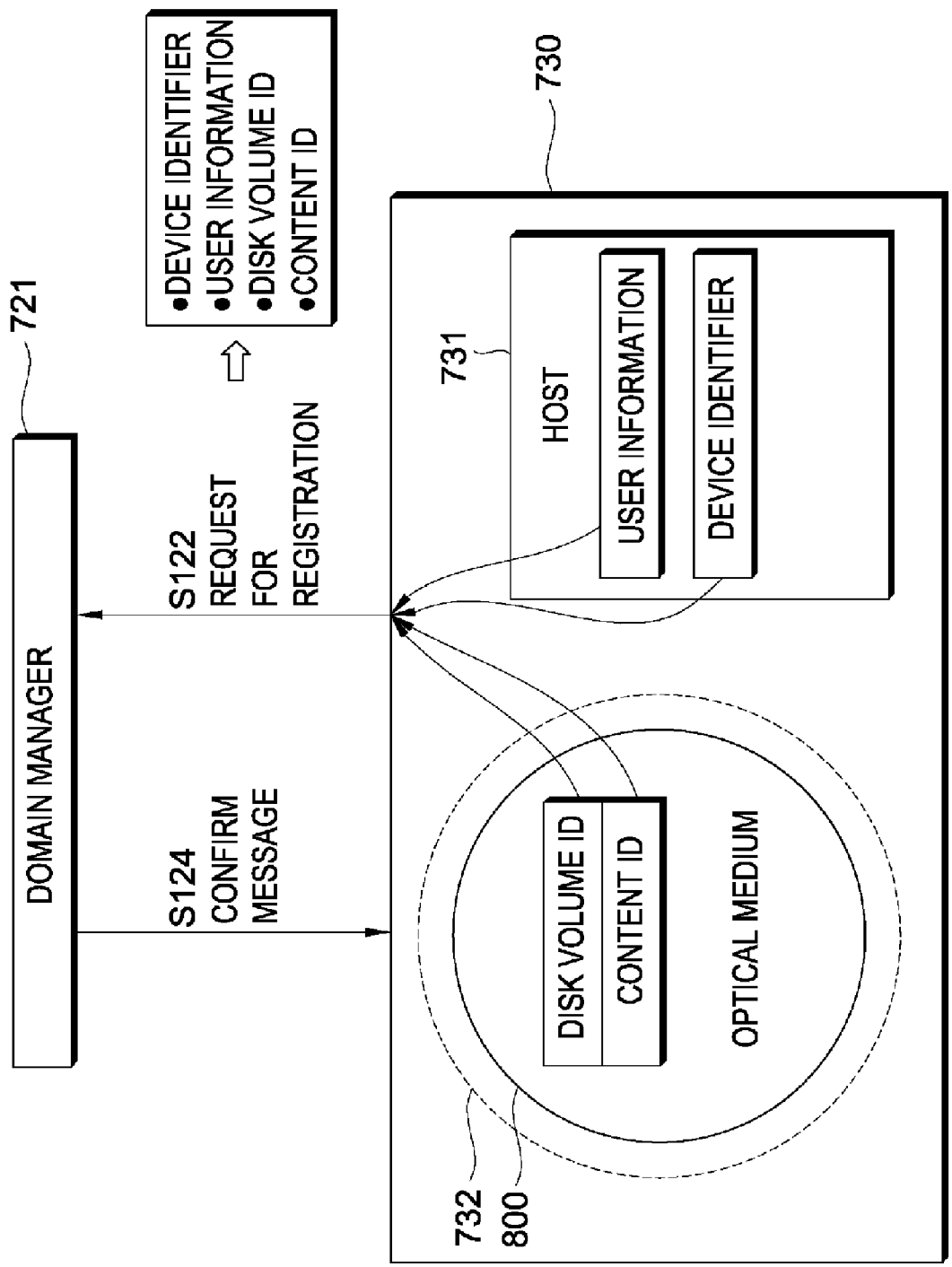

[Fig. 14]
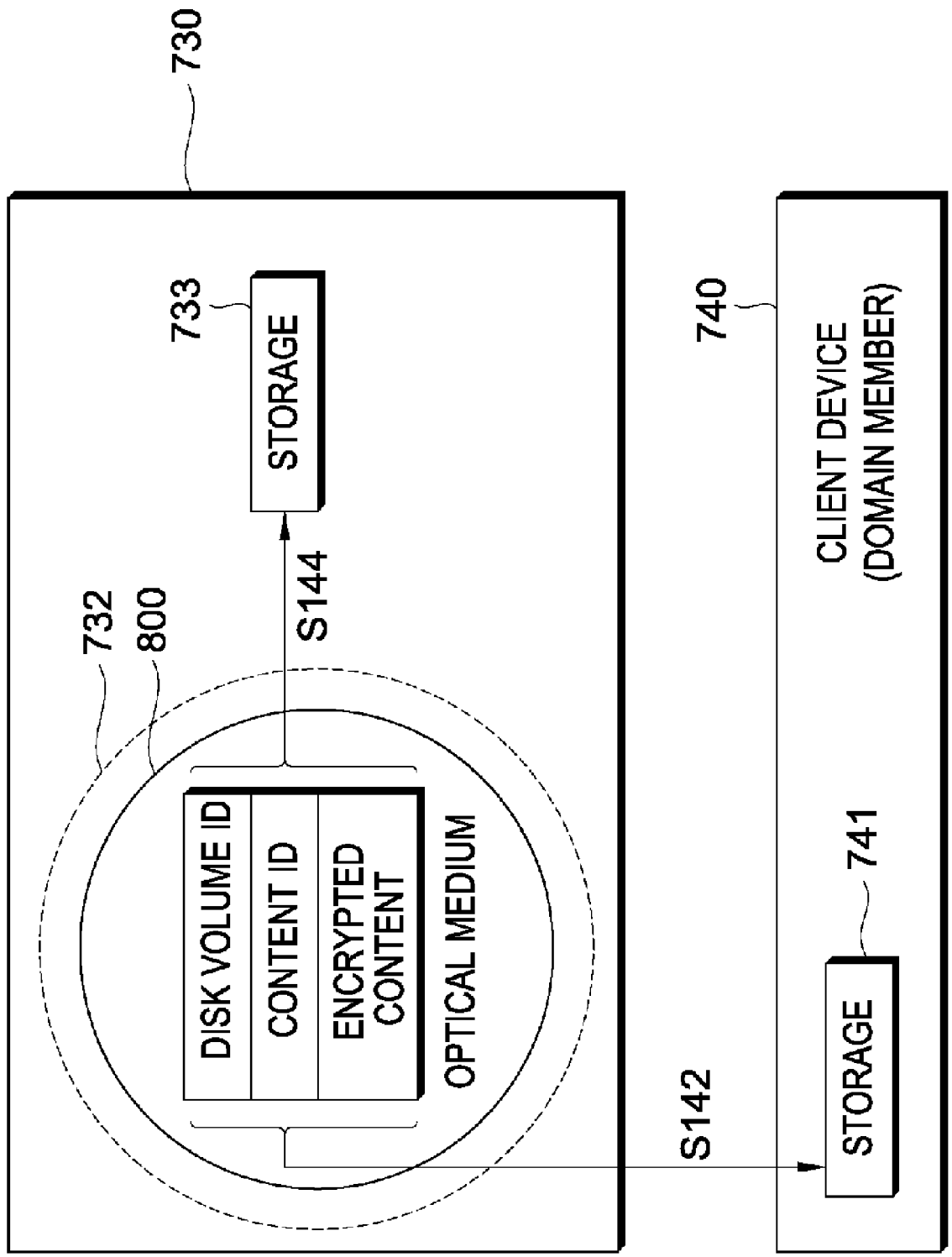

METHOD AND SYSTEM FOR PROCESSING CONTENT

TECHNICAL FIELD

The present invention relates to a method and system for processing content, and more particularly, to a method and a base system for processing content capable of providing a DRM domain service with respect to non-compliant content, and a method and a base system for securing integrity of content to be introduced into the DRM interoperable system through the method and the base system for processing the content.

BACKGROUND ART

Recently, as information has been rapidly digitalized, copyright of digital content becomes important. In general, unlike analogue content, since digital content can be unlimitedly copied without a loss of information, the digital content can be easily exposed to illegal copy and use. Accordingly, a content protection technique capable of safely protecting digital content against illegal copy and use has to be supported in order to provide a digital content service.

A digital rights management (DRM) is a total digital content protection technique capable of allowing only a legally authorized user to use digital content. The DRM provides the total protection framework for distribution of the digital content. For example, digital content is transformed into encrypted data in a package form by using an encryption technique. The digital content cannot be used without a legal authentication process.

The DRM becomes bases of a secured and legal content service in linkage with various content service models. In practice, current content service providers employ DRMs unique to the current content service providers to protect content provided by the current content service providers. For example, in case of a sound source service for providing sound sources through on-line, sound sources that are encrypted as a predetermined encryption pattern are provided so as to prevent illegal copy. The sound sources are reproducible by using only an application provided by the service provider. Accordingly, the user purchases the sound sources from a service provider and reproduces the sound sources by using a device such as a personal computer (PC), a mobile phone, an MP3 player, and the like, in which the application provided by the service provider is installed.

However, since the DRM has technical and political closure properties, different DRMs are not compatible with one another, in general. Accordingly, although the DRM content service has advantages in security and legality as compared with a general content service, the DRM content service has disadvantages in that the usage of the content is limited and inconvenient. The aforementioned problem deteriorates flexibility of a distribution structure of digital contents. Finally, the problem prevents activation of a market of digital content services.

Recently, a DRM interoperable system that provides a interoperable framework in which different DRMs are compatible with one another is suggested.

The DRM interoperable systems commonly employ a concept of a domain as a basic unit of a DRM trusted framework. The domain may indicate a set of authenticated devices or a set of software systems. It is possible for devices or software systems (hereinafter, collectively referred to as devices) which are authenticated in the domain through a predetermined procedure to share contents with the same DRM or different DRMs within an allowed area.

The DRM interoperable system may be constructed by defining functions of entities based on an environment in which the entities that construct the domain physically interact with one another and by suitably linking the entities with one another.

However, in the past, non-compliant content which is not supported by the DRM interoperable system exist. Since the non-compliant content is not supported by the DRM interoperable system, it is impossible to share the non-compliant content in the DRM interoperable system. That is, the non-compliant content may be in contraposition to non-compliant content which can be supported by the DRM interoperable system.

Non-compliant contents may be classified into clean contents and non-clean contents.

The clean contents may indicate original contents which are not encrypted or scrambled. Since the clean contents are not applied with a DRM, there is no rights information therein, in most cases. Accordingly, it is possible to limitlessly use the contents, and however, the contents cannot be protected.

Although the non-clean contents are encrypted or scrambled, the non-clean contents may indicate DRM contents which are not supported by the DRM domain service. Although rights information for using the non-clean contents may exist, the rights information does not satisfy rights information used in the domain, and accordingly, it is impossible to provide the DRM domain service to the non-clean contents. For example, sound sources stored in a compact disc (CD) are scrambled so as to prevent illegal copy. A copy rights may be assigned through a managed copy. However, a method of applying the copy rights to the DRM domain service is not prepared.

The clean contents or non-clean contents may occupy most parts of currently distributed contents. However, in the past, contents supported by the DRM interoperable system, are limited to compliant contents. Accordingly, a plurality of contents are not supported by the DRM domain service. This problem becomes one of important factors which delay popularization and commercialization of the DRM domain service. Accordingly, a method and base system for supporting the non-compliant contents are required to be developed.

DISCLOSURE OF INVENTION

Technical Problem

The present invention provides a method and system for processing contents capable of providing a DRM interoperable service to clean or non-clean contents.

The present invention also provides a method and base system for processing contents capable of securing integrity of non-compliant contents that are externally introduced into a DRM interoperable system.

The present invention also provides a method of processing contents so as to share contents stored in an optical medium in a domain.

Technical Solution

According to an aspect of the present invention, there is provided a method of processing content interoperably, the method comprising: receiving source data from a first system; interoperable-processing the source data and generating a target data; and transmitting the target data to a second system. In the above aspect of the present invention, the first system or the second system include at least one of access control system, copy protection system and use control system.

According to another of the present invention, there is provided a method of processing content by using a DRM interoperable system that constitutes a domain, the method comprising: obtaining content information of the content from a content source, when receiving the content from the content source; transforming the received content into target DRM content suitable for the target DRM; transmitting the transformed target DRM content to a destination client in which the target DRM content is installed; and generating a common license which is extractable license information for using the transformed target DRM content by using the obtained content information.

In the above aspect of the present invention, the content received from the content source may indicate content that is not supported by the DRM interoperable system. The content may be clean content that is original content or non-clean content that is encrypted or scrambled.

In addition, when the content is the clean content, the transforming of the received content into the target DRM content comprise: transcoding the received content into content with a format available for the destination client device; and packaging the transcoded content with a format suitable for the target DRM.

Alternatively, when the content is the non-clean content, the transforming of the received content into the target DRM content may comprise: transforming the received content into clean content by using a decryption key which is provided by at least one of the content source and an external specified system; transcoding the transformed clean content into content with a format available for the destination client device; and packaging the transcoded clean content with a format suitable for the target DRM.

In addition, the content information may include rights limitation information capable of limiting rights to use the content, and the generated common license may include the rights limitation information with a predetermined information format. The rights limitation information may include at least one of information on an allowed usage range of the content and managed copy information.

In addition, the content information may include at least one of a group including: administrator information including an address of an administrator which serves to generally manages the DRM interoperable system; user information including information on the user who is capable of owning or using the content; content title information including information on a title of the content; content format information including information on a file format of the content; and a content index including unique identifier information for indexing the content.

In addition, when the content information includes the content index, the generating of the common license may comprise: determining whether the content index is the same as a content index of predetermined DRM content which is already used in the domain; and requesting the at least one of the input of the user and the content source to provide a new content index.

In addition, the content information may include the administrator information including an access address of the administrator which serves to generally manage the DRM interoperable system. In this case, the generating of the common license may include receiving at least one of rights control information, user information, content title information, content format information, and the content index by accessing the administrator by using the administrator information of the content information.

In addition, the content source may include an optical media driver including an optical medium storing the content and a host capable of reproducing the content. At this time, the optical medium may store a decryption key of the content, the rights limitation information, a content revocation list, a device revocation list, and the like, in addition to the content.

In this case, the method of processing the content may further comprise: performing mutual authentication between the optical media driver and the host; and reproducing the content through the host after the mutual authentication. When the performing the mutual authentication and the reproducing the content, at least one information that is stored in the optical medium is used.

In addition, the method of processing the content may further comprise registering a device including the content source in the administrator of the domain as a domain member or registering the destination client device in the administrator of the domain as a domain member.

In addition, the method of processing the content may further comprise providing the generated common license to the destination client device. In this case, The method of processing the content may further comprise: requesting an entity for issuing a license for the target DRM to issue the license by providing the provided common license to the entity for issuing the license for the target DRM by using the destination client device; and reproducing the target DRM content by using the destination client device through the license that is issued by the entity for issuing the license for the target DRM.

According to another aspect of the present invention, there is provided a system for processing content, the system comprising: a client device to be registered in a domain, the client device in which a target DRM is installed; a content processor which receives content to be transmitted from a content source to the client device and obtains content information of the content from at least one of an input of a user and the content source; a content transformer which receives the content from the content processor, transforms the received content into target DRM content suitable to the target DRM, and transmits the target DRM content to the client device; and a rights manager which receives the content information from the content processor and generates a common license from which is extractable license information for using the transmitted target DRM content by using the received content information.

In the above aspect of the present invention, the client device may receive the generated common license from the rights manager, provide the received common license to a license server for the target DRM, and use the target DRM content transmitted from the content transformer by using a license that is issued by the license server for the target DRM.

In addition, the content processor may be installed in at least one of the client device, the content source, and another device registered in the domain. The content transformer may receive a decryption key for decrypting the content from at least one of the content source and a specified external system in order to transform the content into the target DRM content.

According to another aspect of the present invention, there is provided a method of processing content, the method comprising: receiving content to be transmitted from an external content source to a DRM interoperable system; requesting a security system to check integrity of the received content; and determining whether to transmit the content to the DRM interoperable system on the basis of the result of checking the integrity of the content which is transmitted from the security system.

In the above aspect of the present invention, the determining whether to transmit the content may comprise: determining that it is impossible to transmit the content to the DRM interoperable system, when an error is found in the content, as the result of checking the integrity of the content which is transmitted from the security system.

In addition, the method of processing the content may further comprise requesting the security system to cure the content, when an error is found in the content, as the result of checking the integrity of the content which is transmitted from the security system.

According to another aspect of the present invention, there is provided a method of processing content, the method comprising: registering a first device, which includes an optical medium storing encrypted content and predetermined information for reproducing the encrypted content, in a domain; registering a second device in the domain; transmitting at least one of the encrypted content and the predetermined information from the first device to the second device that is registered in the domain; and transforming the encrypted content that is transmitted to the second device into content that is reproducible by the second device by using the predetermined information.

Advantageous Effects

According to an embodiment of the present invention, it is possible to provide a DRM domain service to non-compliant contents by introducing the non-compliant contents which cannot support a DRM interoperable service or content sharing service into a domain. Accordingly, it is possible to protect clean type or non-clean contents by using a DRM and to safely share the non-compliant contents among client devices with the same DRM or different DRMs.

In addition, it is possible to solve a problem in that improper contents damages a DRM interoperable system by improving reliability by checking integrity of non-compliant contents that are introduced in the DRM interoperable system.

BRIEF DESCRIPTION OF THE DRAWINGS

The above and other features and advantages of the present invention will become more apparent by describing in detail exemplary embodiments thereof with reference to the attached drawings in which:

FIG. 1 is a block diagram illustrating basic entities which construct a DRM interoperable system;

FIG. 2 illustrates an example of a basic operation of a DRM interoperable system;

FIG. 3 illustrates an example of an operation of a DRM interoperable system, when non-compliant content is introduced into a client device;

FIG. 4 illustrates a structure of a DRM interoperable system, when a non-compliant content processor is included in a client device A;

FIG. 5 illustrates a structure of a DRM interoperable system, when a non-compliant content processor is included in a content source;

FIGS. 6 to 9 illustrate examples of structures of systems for securing integrity of non-compliant content;

FIG. 10 illustrates an example of a procedure for securing integrity of non-compliant content that is introduced into a DRM interoperable system;

FIG. 11 illustrates an example of a method of processing content according to another embodiment of the present invention;

FIG. 12 illustrates an example of a procedure of performing authentication between an optical medium and a host;

FIG. 13 illustrates an example of a procedure of registering an optical medium reproduction device in a domain; and FIG. 14 illustrates an example of a procedure in which content is shared among devices that are registered in a domain.

REFERENCE NUMERALS

30: content source
70: DRM-A license server
100': DRM interoperable system
110: domain manager
120: rights manager
130: content transformer
150: non-compliant content processor
CA: client device A

BEST MODE FOR CARRYING OUT THE INVENTION

Now, preferred embodiments of the present invention will be described in detail with reference to the attached drawings. In addition, in order to clearly describe exemplary embodiments with reference to the accompanying drawings, specific technical terms are used. However, the present invention is not limited to the selected specific technical terms, and each specific technical term includes all the technical synonyms which operate in a similar manner so as to achieve a similar entity.

FIG. 1 is a block diagram illustrating basic entities which construct a DRM interoperable system. In FIG. 1, relationship among a domain, main entities which construct the domain, and other entities is exemplified.

As shown in FIG. 1, a DRM interoperable system 100 constructs a domain 10 as a basic unit of a DRM trusted system. Here, the domain is a service area served by the DRM interoperable system. The domain 10 may indicate a set including authenticated devices, software systems, communication nodes, and the like.

The domain 10 may be constructed by using a physical concept. Selectively the domain 10 may be constructed by using only a logical concept. Selectively the domain 10 may be constructed by using the physical and logical concepts. For example, the domain 10 may be constructed as a set of authenticated devices in a specific local area. Selectively, the domain 10 may be constructed as a set of logically authenticated devices regardless of a local area. Selectively, the domain 10 may be constructed as a set including a set of authenticated devices in a local area and a set of logically authenticated devices which are external to the local area.

in the present embodiment, a case where the DRM interoperable system 100 constructs a domain that is constructed by using a physical concept will be described. Accordingly, hereinafter, the domain 10 may indicate a set of authenticated devices in a specific local area. However, the present invention is not limited thereto. It is possible to apply the aforementioned various domains (for example, a set of logical devices regardless of a local area, a set including authenticated devices in a local area and authenticated devices that are external to the local area, and the like) in addition to a domain that is constructed by using a physical concept to the present invention.

When the DRM interoperable system 100 constructs the domain 10, a user logins the DRM interoperable system 100, constructs a domain by using devices in a local area, and uses desired contents. For example, the user constructs a domain by setting a house of the user to a local area. The user can legally share sound sources, videos, games, and the like which are protected by various DRMs among devices such as a personal computer (PC), a portable multimedia player (PMP), a MP3 player, a CD player, a mobile phone, a personal digital assistant (PDA), and the like and reproduce the sound sources, the videos, the games, and the like.

Referring to FIG. 1, the DRM interoperable system 100 may be constructed with entities such as a client 140, a content transformer 130, a domain manager 110, a rights manager 120, a reference point controller 150, and the like.

At this time, the entities 110 to 150 uniquely have functions as modules which can be mounted on a predetermined device in or out of the domain 10. Main functions of each entity and preferable mounting locations of each entity will be described in the following.

1. Client 140: The client 140 is an entity that finally uses the content. That is, the client 140 may indicate an end point which uses the content. The client 140 may be mounted on a device in the domain 10, such as a mobile phone, a PC, a PDA, a TV, a CD, a PMP, a mobile MP3 player, and the like. At this time, the device on which the client 140 is mounted will be referred to as a client device. A specified DRM can be installed in the client device. The client 140 supports various functions in linkage with other entities 110 to 130 so that the client device may be compatible with a different type of DRM.

2. Content transformer 130: The content transformer 130 serves to transform externally received content into content with a specified target DRM. For example, when content with a DRM A is input, the content transformer 130 transforms the content with the DRM A into content with a DRM B that is target DRM. In addition, the content transformer 130 may transform clean content that is not applied with a DRM into content with a target DRM. Alternatively, the content transformer 130 may transform encrypted or scrambled content into content with the target DRM. The content transformer 130 may be mounted on a predetermined device, for example, the client device. In some cases, the content transformer 130 may be mounted on an external system.

3. Domain manager 110: The domain manager 110 is an entity which serves to manage the domain 10. For example, the domain manager 110 may serve to create the domain 10, destroy the domain 10, register and manage the client 140 and the client device, authenticate the client 140, register and manage the reference point controller, and authenticate the reference point controller.

The domain manager 110 may exist at any location in or out of the domain 10. For example, in the example shown in FIG. 1, the domain manager 110 exists out of the domain 10. Preferably, the domain manager 110 may be mounted on a system in the side of a service provider. The domain manager may interact with devices in the domain through a wide area communication network such as the Internet. On the contrary, the domain manager 110 may exist in the domain 10. In this case, the domain manager 110 may be mounted on a predetermined device in the domain 10.

4. Rights manager 120: The rights manager 120 serves to manage rights information of the user for using content and issue a common license for using the content. Here, the common license is compatible license information from which a license with a different type of DRM can be extracted. In addition, the rights manager 120 is a typical online service manager which provides a login function so that the user can access the DRM interoperable system 100 and stores the rights information of the user for using the content. The user who accesses the DRM interoperable system 100 by using a logon function of the rights manager 120 can construct the domain 10 by calling the domain manager 110 and use the content by using the client device registered in the domain 10. As described above, the client device may indicate a device on which the client 140 is mounted in the domain 10.

As shown in FIG. 1, the rights manager 120 may be mounted on an outside of the domain, for example, a system in the side of the service provider. However, the rights manager 120 doesn't have to exist in the side of the service provider. In some cases, the rights manager 120 may be mounted on a predetermined device in the domain 10.

5. Reference point controller 150: The reference point controller 150 is an entity which determines a range of a local area and an environment for constructing the domain 10. The range of the local area may be determined based on a physical distance, the number of hops, a reaction time, and the like. The reference point controller 150 includes a function of checking proximity of a device, periodically or at a predetermined time. The reference point controller 150 can check whether a predetermined device exists in the local area. In addition, the reference point controller 150 can provide a domain credential to the client 140 which is verified to exist in the local area. At this time, the domain credential indicates information for representing that the client 140 exists in the local area.

In addition, the reference point controller 150 may serve as a representative which is representative of the clients 140 included in the domain 10 in the local area. For example, the reference point controller 150 may serve as an intermediary when information is exchanged between the client 140 and the domain manager 110. Alternatively, the reference point controller 150 may serve to store and manage information on the clients 140 belonging to the domain 10 and provide the information to the domain manger 110.

The reference point controller 150 may be determined as a predetermined device in the domain 10 in the local area. That is, the reference point controller 150 may be a device selected from among client devices in the domain. For this, when the domain 10 is initially constructed, a process of selecting the reference point controller 150 is performed.

The process of selecting the reference point controller 150 may be performed by exchanging information among the client devices. For example, when the domain 10 is initially constructed, the client devices exchange capability information among the client devices. A client device of which capability is the highest may be selected as the reference point controller 150. At this time, the capability may indicate numerical information on performance of a device, for example, a residual amount of a battery, a system specification, a network communication speed, and the like.

Alternatively, the process of selecting the reference point controller 150 may be performed by the domain manager 110. For example, when the domain 10 is initially constructed, the client devices report the capability information on the client devices to the domain manager 110. The domain manager 110 can select a client device of which capability is the highest as the reference point controller 150 by comparing the reported capability information pieces on the client devices with one another.

On the other hand, in the process of selecting the reference point controller 150, a candidate device which is to replace the reference point controller 150, when an error occurs in the reference point controller 150, may be selected. The reference point controller 150 reports that the reference point controller 150 normally operates by periodically communicating information signals with the domain manager 110 or a predetermined client. When the information signals are not transmitted from the reference point controller 150 to the domain manager 110 or the predetermined client, the current reference point controller 150 loses the position of the reference point controller 150, and the candidate device may replace the reference point controller. In this case, a new reference point controller is registered by the domain manager. Although it is advantageous that a non-mobile domain device having many computing resources is determined as the reference point controller 150, a mobile domain device such as a mobile phone may be also determined as the reference point controller 150.

The DRM interoperable system 100 may further include a virtual client, a client proxy, a content relation manager, and the like, in addition to the aforementioned entities 110 to 150. The description on the entities that are not directly related to the present invention will be omitted.

When using the DRM interoperable system 100, the user can share and use the content among the client devices belonging to the domain 10, although the types of the DRMs installed in the client devices in the domain 10 are different from one another.

FIG. 2 illustrates an example of a basic operation of a DRM interoperable system 100. FIG. 2 illustrates operations to be performed in the DRM interoperable system 100, when DRM-A content is stored in a client device A CA and when the user desires to transmit the DRM-A content to the a client device B CB and use the content in the client device B CB.

Referring to FIG. 2, the client device A CA and the client device B CB have to be verified to be members of the domain 10 by requesting the domain manager 110 to authenticate the client device A CA and the client device B CB (operations S1 and S2).

The client device A CA makes a request for transmitting the DRM-A content to the client device B CB, after authenticating the client device A CA and the client device B CB. The request may be transmitted to the content transformer 130 and the rights manager 120 (operations S3 and S4). The content transformer 130 transforms the DRM-A content into content suitable for the DRM B (operation S5) and transmits the content suitable for the DRM B to the client device B CB (operation S6).

On the other hand, the rights manager 120 stores and manages rights information of the user. The rights information includes the rights information of the user for using the DRM-A content. The rights manager 120 issues the common license including the rights information of the user for using the DRM-A content to the client device B CB (operation S7). The issued common license indicates license information which is compatible with the DRM A and the DRM B.

Accordingly, after the client device B CB provides the common license to a DRM-B license server 20, the client device B CB receives the DRM B license needed for using the content transmitted from the DRM-B license server 20 to use the DRM R license (operations S8 and S9). At this time, the rights manager 120 may allow the DRM-B license server 20 to provide the DRM B license to the client device B CB by directly providing the common license to the DRM-B license server 20. Alternatively, the rights manager 120 may receive the DRM-B license suitable for the DRM B and provide the received DRM-B license to the client device B CB, after the rights manager 120 provides the common license to the DRM-B license server 20.

FIG. 3 illustrates an example of an operation of a DRM interoperable system, when non-compliant content is introduced into a client device. In FIG. 3, a structure of the DRM interoperable system according to an exemplary embodiment of the present invention and a procedure of processing non-compliant content are shown.

As shown in FIG. 3, the DRM interoperable system 100' according to an exemplary embodiment of the present invention further includes a non-compliant content processor 150 so as to process non-compliant content. The non-compliant content processor 150 serves to transform non-compliant content that is received from a content source 30 into content with a format which can be supported by the DRM interoperable system 100'. Accordingly, external non-compliant content may be introduced into the DRM interoperable system 100' through the non-compliant content processor 150.

First, the non-compliant content processor 150 obtains predetermined non-compliant content to be transmitted from the content source 30 to the client device A CA (operation S10). At this time, the content source 30 may indicate a device including content in a local environment such as a PC, a CD player, an MP3 player, a blue-ray disc (BD) player, a holographic disc (HD) player, a set top box, a mobile phone, a television (TV), and the like. Alternatively, the content source 30 may indicate an external device or system which is interactive through a wide area communication network such as the Internet, for example, a content server. At this time, the device indicates a concept including a logical device, for example, a software system, in addition to a physical device (for example, when a plurality of software systems exist in a predetermined physical device and when the software systems have different DRMs or reproducing systems from one another, each software system is considered as a separate device).

The non-compliant content obtained by the non-compliant content processor 150 may be sound sources, videos, games, images, and the like. The non-compliant content may indicate content with a clean type which is not encrypted or scrambled or content with a non-clean type which is not compatible with another DRM. For example, when the content source 30 is a CD player, the non-compliant content is sound sources of a CD that is inserted in the CD player. In this case, the sound sources indicate content with the non-clean type. The non-compliant content processor 150 may obtain the non-compliant content by requesting the content source 30 to provide the non-compliant content or by receiving content in response to a transmission request from the content source 30.

The non-compliant content processor 150 obtains information on the non-compliant content, in addition to the non-compliant content (operation S11). At this time, the non-compliant content processor 150 may obtain the information on the non-compliant content by requesting the content source 30 to provide the information or by receiving an input from the user. When the information on the non-compliant content is obtained through the input from the user, the non-compliant content processor 150 provides a window for inputting content information to the user.

The information on the non-compliant content includes administrator information, user information, content title information, content format information, content index, and rights limitation information, and the like.

The administrator information may indicate an address (for example, a uniform resource locator (URL) address) of an administrator which performs general management, when a DRM is enabled to be compatible with another DRM. For example, the administrator information may include an address of the rights manager 120 or the domain manager 110 in the DRM interoperable system 100'. As described above, the rights manager or domain manager may be included in the side of the service provider. In this case, the non-compliant content processor 150 may obtain the user information, the content title information, the content format information, the rights limitation information, the content index information, and the like, after accessing the rights manager or the domain manager which is a system in the side of the service provider by using the administrator information included in the transmitted content information.

The user information may indicate information on a user who has the non-compliant content and who is capable of using the content. The content title information may indicate a title of the non-compliant content, for example, a title of a sound source such as "Beyonce—Crazy Love", a title of a video "love Actually", and the like. The content format information may indicate information on a file format of the non-compliant content.

The content index may indicate a unique identifier for indexing the non-compliant content. The content index may be provided by the content source 30 or may be set by an input from the user, so that the content index may not be the same as that of the DRM-A content which is shared in the domain 10' When the content index is the same as that of the DRM-A content which is shared in the domain 10' an error occurs in a procedure of issuing the common license to be described in the following, and the user is requested to input a new content index.

The rights limitation information may indicate information on usage limitation of the non-compliant content. For example, the rights limitation information defines an admission range in which the non-compliant content is available, such as "100 times of reproduction", "reproduction for thirty days", "infinite times of reproduction", "ten times of copies", and the like. The rights limitation information is included in the common license, when the common license is issued.

The non-compliant content processor 150 may receive the rights limitation information from the user or automatically extract the rights limitation information from the content source side. Here, when the user inputs the rights limitation information, the user can input the rights limitation information through the window for inputting the content information which is provided by the non-compliant content processor 150.

In case of the non-compliant content, specifically, clean content, there is no rights information, in general. When there is no rights information, the user has to input predetermined rights limitation information through the window for inputting the content information which is provided by the non-compliant content processor 150. For example, when the user desires to protect and freely use the content with the clean type which is produced or obtained by the user based on predetermined limitation, the user can input desired rights limitation information into the non-compliant content processor 150. On the other hand, when the non-clean content or the clean content may provide limitation information of the content as a recommendation or warning, the user prevents illegal use of the content by inputting the rights limitation information corresponding to the recommendation or warning into the non-compliant content processor 150 or extracting the rights limitation information from the content source 30.

In addition, in case of the non-clean content, the rights limitation information may exist based on a managed copy function. The managed copy function indicates a function of allowing a user of content to purchase rights to use the content by accessing the content source, for example, a content service server through a communication network. At this time, it is possible for the user to copy or use the content as many times as the number admitted by the copyright holder or the number required by the user. That is, the rights limitation information exists in the managed copy function. In this case, the side of the content source 30 may provide the rights limitation information, which is generated due to the purchase, to the non-compliant content processor 150. Alternatively, the user may directly input the rights limitation information into the non-compliant content processor 150. The non-clean content may include rights limitation information that is not included in the existing DRM system. The rights limitation information may be input and reflected.

When the compliant content and the information on the compliant content are obtained, the non-compliant content processor 150 requests the content transformer 130 to transform the compliant content (operation S12). Then, the content transformer 130 transforms the compliant content into content with the DRM A that is a target DRM (operation S13).

Here, when the compliant content is non-clean content, the content transformer 130 transforms the compliant content into clean content by decrypting the compliant content. Since the non-clean content is encrypted or scrambled, a decryption key is needed to decrypt the non-clean content. The non-compliant content processor 150 may obtain the decryption key by requesting the content source 30 to provide the decryption key (or component information from which the decryption key is extractable) and provide the decryption key to the content transformer 130. Alternatively, the content transformer 130 may directly request the content source 30 to provide the decryption key.

Subsequently, the content transformer 130 transcodes the decrypted clean content into content with a format which is reproducible by the client device A CA and packages the transcoded content with a format suitable for the DRM A that is the target DRM. Accordingly, the compliant content is transformed into the DRM-A content. When the compliant content is the clean content, the content transformer 130 can perform a transcoding procedure and an encryption procedure without performing the decryption procedure.

When the compliant content is transformed into the DRM-A content through the aforementioned procedure, the content transformer 130 transmits the transformed DRM-A content to the client device A CA (operation S14). Accordingly, the client device A CA may store the DRM-A content obtained by transforming the non-compliant content. Here, the client device A CA is a device that is authenticated by the domain manager 110 as a normal domain member.

On the other hand, the non-compliant content processor 150 transmits content information of the compliant content to the rights manager and makes a request for issuing the common license (operation S15). At this time, the content information includes a content index, rights limitation information, and the like.

The rights manager 120 generates the common license including the rights limitation information of the compliant content in a predetermined (promised) information format and issues the generated common license to the client device A CA (operation S17). At this time, the issued common license indicates interoperable license information which is extractable from a DRM that is supportable by the DRM interoperable system 100' in addition to the DRM A. When issuing the common license, in a case where the content index included in the content information is the same as that of other content that is already being used, the rights manager 120 makes a request for providing a new content index by reporting to the non-compliant content processor 150 that the content index included in the content information is the same as that of other content. In this case, the non-compliant content processor 150 requests the user to input a new content index or requests the content source to provide a new content index.

The client device A CA which receives the common license provides the common license to the DRM-A license server 70 and requests the DRM-A license server 70 to issue the DRM-A license need for using the DRM-A content that is received from the content transformer 130 (operation S18). Then, the DRM-A license server 70 issues the DRM-A license for using the DRM-A content to the client device A CA by using the provided common license (operation S19).

Accordingly, the client device A CA can use the DRM-A content obtained by transforming the compliant content through the issued DRM-A license (operation S20). In addition, it is possible to share the DRM A stored in the client device A CA with another client device (not shown). Here, an operation for the DRM compatibility between client devices in the domain was described with reference to FIG. 2.

On the other hand, when issuing the common license, as described above, the rights manager 120 may issue the common license to the client device A CA. Selectively, after issuing the common license to the non-compliant content processor 150 or the content source 30, the DRM-A license may be transmitted to the client device A CA by allowing an entity which receives the common license to request the DRM-A license server 70 to issue the DRM-A license. Selectively, the rights manager 120 may directly provide the common license to the DRM-A license server 70, and the DRM-A license server 70 which receives the common license may issue the DRM-A license for using the DRM-A content to the client device A CA.

Up to now, the method of providing the compliant content which is not compatible with another DRM to the client device A CA in the domain 10' that is the DRM interoperable service area has been described. In FIG. 3, although the non-compliant content processor 150 is shown as a separate entity in the domain, the present invention is not limited thereto. The non-compliant content processor may be located at any location in or out of the domain. In addition, the non-compliant content processor may be separately mounted on a predetermined device or may be integrated into a predetermined entity of the DRM interoperable system as a function thereof.

FIG. 4 illustrates a structure of a DRM interoperable system 100'', when a non-compliant content processor 150' is included in a client device A CA'. In this case, the non-compliant content processor 150' may be mounted as an entity separately from the client that is an entity mounted on the client device A CA'. Alternatively, the non-compliant processor 150' may be embodied as a function of the client by being included in the client as a sub-module.

Referring to FIG. 4, when the non-compliant content processor 150' is included in the client device A CA'. the client device A CA' may serve to obtain non-compliant content and content information thereof, make a request for transforming content, and make a request for issuing a common license. At this time, the user can input the content information of the compliant content into the client device A CA' in the domain 10''.

On the other hand, when the non-compliant content has a non-clean type, for example, when the non-compliant content is sound sources of a CD, the client device A CA' extracts a decryption key for decrypting the non-compliant content or component information from which the decryption key is extractable from the content source 30 or receives the decryption key or the component information by requesting the content source 30 to provide the decryption key or the component information.

FIG. 5 illustrates a structure of a DRM interoperable system 100'''. when a non-compliant content processor 150'' is included in a content source 30'.

Referring to FIG. 5, when the non-compliant content processor 150'' is included in the content source 30', the content source 30' requests the content transformer 130 in the DRM interoperable system 100''' to transform content and requests the rights manager 120 in the DRM interoperable system 100''' to issue a common license by directly extracting content information. At this time, the user can input the content information of the compliant content by accessing the content source 30'.

In addition, when the non-compliant content has a non-clean type, the content source 30' can provide a decryption key for decrypting the non-compliant content or component information from which the decryption key is extractable to the content transformer 130.

On the other hand, when the non-compliant content is introduced into the DRM interoperable system, it is necessary to secure the integrity of the non-compliant content. At this time, the integrity of the non-compliant content may indicate a state in which the non-compliant content has no fault, that is, the non-compliant content is not damaged due to contamination. Accordingly, when the integrity is secured, the non-compliant content is secured and trusted content.

Hereinafter, a procedure of processing non-compliant content capable of securing the integrity of the non-compliant content and a base system therefor will be described in detail.

FIGS. 6 to 9 illustrate examples of structures of systems for securing integrity of non-compliant content.

First, referring to FIG. 6, in order to secure the integrity of the non-compliant content that is transmitted from a content source 200 to a DRM interoperable system 500, a system has to include a content integrity manager 300 for managing checking of the integrity of the non-compliant content that is transmitted from the content source 200 to the DRM interoperable system 500.

The content integrity manager 300 serves to request a security system to check the integrity of the non-compliant content that is transmitted from the content source 200 to the DRM interoperable system 500, determine whether the non-compliant content is transmitted based on the result of checking the integrity, and report the determination result to the DRM interoperable system 500 or the content source 200. Here, the DRM interoperable system 500 may indicate a system that includes a function of processing the aforementioned non-compliant content (100' of FIG. 3, 100'' of FIG. 4, and 100''' of FIG. 5). In addition, the content integrity manager 300 can perform the aforementioned function with respect to compliant content that is externally introduced into the DRM interoperable system 500, in addition to the non-compliant content.

The content integrity manager 300 may interact with the security system 400. The security system 400 serves to perform checking of the integrity of the non-compliant content that is requested by the content integrity manager 300. The security system 400 may be a virus check system. In addition, the security system 300 may have a function of removing an error, when the error is found as the result of checking the integrity of the non-compliant content, in addition to the function of checking the integrity of the non-compliant content.

As shown in FIG. 6, the security system 400 may interact with the content integrity manager 300 and the DRM interoperable system 500 out of the DRM interoperable system 500. Alternatively, the security system 400 may be included in the DRM interoperable system 500. FIG. 7 shows that a security system 400' may be included in a DRM interoperable system 500'.

In addition, as shown in FIG. 6, the content integrity manager 300 may be externally constructed as a system separately from the DRM interoperable system 500. Alternatively, the content integrity manager 300 may be included in the DRM interoperable system 500. FIG. 8 shows that a content integrity manager 300" is included in a DRM interoperable system 500" as an entity.

On the other hand, the content integrity manager 300 and the security system 400 may be included in the DRM interoperable system 500. FIG. 9 shows a case where a content integrity manager 300 and the security system 400' are included in the DRM interoperable system 500". It is determined which system is selected from among the systems of FIGS. 6 to 8 based on an execution environment.

FIG. 10 illustrates an example of a procedure for securing integrity of non-compliant content that is introduced into a DRM interoperable system. The system employs the structure of the system shown in FIG. 6 so as to easily understand the procedure.

As shown in FIG. 10, predetermined non-compliant content is transmitted from the content source 200 to the content integrity manager 300 (operation S40). Here, the non-compliant content is to be introduced into the DRM interoperable system 500.

The content integrity manager 300 requests the security system 400 to check the integrity of the transmitted non-compliant content (operation S41). Then, the security system 400 checks the integrity of the non-compliant content, in response to the aforementioned request (operation S42). When checking the integrity, there are cases including a case where there is no error in the non-compliant content and a case where an error is found in the non-compliant content. When checking of the integrity is completed, the security system 400 reports the checking result of the integrity to the integrity manager 300 (operation S43).

The content integrity manager 300 determines whether the non-compliant content is transmitted to the DRM interoperable system 500 based on the checking result of the integrity (operation S44) and reports the determination result to the DRM interoperable system and the content source (operations S45 and S46).

For example, as the result of checking the integrity, when there is no error in the non-compliant content, the content integrity manager 300 determines that the integrity of the non-compliant content is secured and reports to the DRM interoperable system 500 and the content source 200 that the non-compliant content is normally transmitted to the DRM interoperable system 500. Then, the non-compliant content is transmitted to the DRM interoperable system 500. At this time, information for representing that the integrity is checked by the security system 400 may be inserted into the transmitted non-compliant content.

On the other hand, as the result of checking the integrity, when an error is found in the non-compliant content, the content integrity manager 300 determines that the integrity of the non-compliant content is not secured and reports to the DRM interoperable system 500 and the content source 200 that it is impossible to transmit the non-compliant content to the DRM interoperable system 500. At this time, the content integrity manager 300 may request the content source 200 to check the integrity and may request the content source 200 to transmit the checked content again. In addition, the content integrity manager 300 transmits the report that it is impossible to transmit the non-compliant content only to the DRM interoperable system 500. The DRM interoperable system 500, which receives the report, may report to the content source 200 that it is impossible to transmit the non-compliant content by transmitting a message for representing that it is impossible to issue a common license to the content source 200 and make a request for transmitting the non-compliant content again.

On the other hand, as the result of checking the integrity, when an error is found in the non-compliant content, the content integrity manager 300 may request the security system 300 to cure the non-compliant content. The security system 400 may report the cure result to the content integrity manager 300, after curing the non-compliant content in response to the request. The content integrity manager 300, which receives the report, may determine whether to transmit the non-compliant content based on whether the requested cure is normally performed and report the determination result to the DRM interoperable system 500 or the content source 200. That is, when the cure is normally performed, it is reported that the content is normally transmitted by determining that the integrity of the non-compliant content is secured. When the cure is not normally performed, it is reported that it is impossible to transmit the non-compliant content.

Up to now, the techniques for providing a domain service by importing non-compliant content included in the content source into a client device in the domain have been described. The user can share and use non-compliant content among devices with the same DRM or different DRMs by importing the non-compliant content, which is stored in a computer, a mobile phone, a CD, a BD, an HD, and the like, into a predetermined client device in the domain.

Hereinafter, another example in which the user purchases a CD, a BD, and an HD, imports non-compliant content stored in an optical medium into the domain, and uses the non-compliant content will be described. In an embodiment to be described in the following, procedures of providing services from purchasing of content to reproduction of the content are emphasized.

FIG. 11 illustrates an example of a method of processing content according to another embodiment of the present invention.

Referring to FIG. 11, at first, a user purchases an optical medium in an off-line store 710 (operation S100). For example, the user purchases a desired CD or BD in a record shop.

At this time, content purchased by the user is stored in the optical medium. The content may be non-compliant content with a non-clean type. The optical medium stores decryption key information for decrypting the content, usage rule information for controlling rights on the content, a content revocation list for preventing illegal content from being used, and a device revocation list, and the like, in addition to the content. Here, the decryption key information indicates a decryption key for decrypting the non-compliant content or component information from which the decryption key is extractable. In addition, the usage rule information may indicate rights limitation information included in content information of the content.

The user can render the content stored in the purchased optical medium through an optical medium reproduction device 730 (for example, a CD player or BD player). The optical medium reproduction device 730 may be constructed with an optical media driver 732 for physically including the optical medium to drive the optical medium and a host 731 including an application and an operating system (OS) for reproducing the content stored in the optical medium. When rendering the content, an authentication process may be performed between the optical media driver 732 and the host 731 (operation S110).

FIG. 12 illustrates an example of a procedure of performing authentication between an optical medium and a host.

As shown in FIG. 12, the host 731 transmits a device certificate of the host 731 to the optical media driver 732 (operation S112). The device certificate of the host 731 may indicate a unique device certificate included in the host 731 when the host 731 is manufactured.

The optical media driver 732 checks whether the received device certificate is included in the device revocation list that is stored in an optical medium 800. When the device certificate of the host 731 is not included in the device revocation list, it is possible to transmit a confirm message for allowing the content to be rendered (operation S114). Then, the host 731 can reproduce the content that is stored in the optical medium. The usage rule stored in the optical medium may be considered, when reproducing the content.

Alternatively, when the device certificate transmitted from the host 731 is included in the device revocation list, the optical media driver 732 may transmit a disallowance message for disallowing rendering of the content by the host 731 to the host 731. In this case, the host is not allowed to render the content.

On the other hand, in order to transmit the content stored in the optical medium 800 to the client device 740 in the domain, the user can register a device including the optical media driver 732, which is the optical medium reproduction device 730, in the domain (operation S120). At this time, the domain manager 721 may be included in an on-line front store 720 of the service provider. In the description with reference to FIG. 1, it is already described that the domain manager 721 may be included in a system in the side of the service provider.

FIG. 13 illustrates an example of a procedure of registering an optical medium reproduction device in a domain.

As shown in FIG. 13, a content ID for uniquely identifying content stored in the optical medium 800 and a disk volume ID for uniquely identifying the optical medium are stored in the optical medium 800. When requesting the domain manager 721 to register the optical medium reproduction device 730 in the domain, the optical medium reproduction device 730 can provide the content ID and the disk volume ID to the domain manager. In addition, when making a request for registering the optical medium reproduction device 730 in the domain, the optical medium reproduction device 730 provides a unique device ID of an optical medium reproduction device and user information to the domain manager 721. At this time, the optical medium reproduction device 730 may receive the user information from the user.

As described above, the optical medium reproduction device 730 provides the content ID, the disk volume ID, a device identifier, the user information, and the like to the domain manager 721 that is an entity for managing the domain and requests the domain manager 721 to register the optical medium reproduction device 730 in the domain (operation S122). Then, the domain manager 721 transmits a confirm message to the optical medium reproduction device 730, after registering the optical medium reproduction device 730 in the domain, in response to the request (operation S124). The domain manager 721 in the side of the service provider may limit the usage range of the content (for example, a movement and a copy of the content) by using the provided information.

Next, the client device 740, which is to receive the content stored in the optical medium 800, is registered in the domain, after being authenticated by requesting the domain manger 721 to register the client device 740 in the domain (operation S130). For example, the user can register the client device 740, which is to receive content from the optical medium reproduction device 730 registered in the domain and use the received content, in the domain. At this time, when the client device 740, which is to receive the content, is already registered in the domain, the procedure (operation S130) may be omitted.

When the optical medium reproduction device 730 that is to transmit the content and the client device 740 that is to receive the content are registered in the domain, the content may be shared between the registered devices (operation S140).

FIG. 14 illustrates an example of a procedure in which content is shared among devices which are registered in a domain.

As shown in FIG. 14, encrypted content, a disk volume ID, a content ID, and the like may be directly transmitted from the optical media reproduction driver 732 of the optical medium reproduction device 730 to the client device 740 (operation S142). Alternatively, content, a disk volume ID, a content ID may be transmitted from the optical media reproduction driver 732 to a storage 733 of the optical medium reproduction device 730 (operation S144). The content, the disk volume ID, the content ID, and the like, which are stored in the storage 733 of the optical medium reproduction device 730, may be transmitted to the client device 740, again. The information transmitted to the client device 740 may be stored in a storage 741 of the client device 740.

Then, the client device 740 transforms the content stored in the storage 741 into content with a format which is reproducible by the client device 740 and reproduces the transformed content based on rights that is allowed in the license. Detailed procedures and architecture on this process was described in detail in the aforementioned embodiment. For example, information needed for using the content, such as a decryption key value, a usage rule, and the like may be provided through the on-line front store 720 of the service provider in on-line or may be input by the user. Selectively, the information may be used by receiving information stored in the optical medium.

In the aforementioned embodiment of the present invention, although an example of transmitting content from the optical medium reproduction into which the optical medium is inserted to another client device in the domain is described, the content of the optical medium inserted into the optical medium reproduction device may be transmitted to a software system included in the optical medium reproduction device and used based on an execution environment. In this case, the transformation of the license and the transformation of the content may be performed according to the aforementioned procedures (in the same physical device). That is, the device that is mentioned in the present invention is not limited to a physical device. The device may include a logical device (for example, a software system).

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A computer-implemented method comprising:
receiving, at a device, content from a content source;

obtaining from at least one of the content source and an user interface of the device, information including rights of the received content and a content index indexing the received content;

performing an integrity check on the received content, in order to verify an integrity of the received content, using a security system;

determining that the received content is transmitted to an interoperable domain on the basis of a result of the integrity check indicating that the integrity of the received content is secured;

transforming the received content into a target content of a specific type suitable for a target Digital Rights Management (DRM) device that is joined to an interoperable domain based on determining the transmission to the interoperable domain;

generating a common license of the target content including the rights of the content in a predetermined format that can be used as an interoperable license within the interoperable domain, using the obtained information; and transmitting the transformed target content and generated common license to the target DRM device, wherein generating the common license of the target content comprises:

determining whether the content index included in the obtained information is the same as another content index of another content within the interoperable domain, and on determining that the content index included in the contained information is the same as the another content index, requesting at least one of the content source and the user interface to transmit a new content index.

2. The method of claim 1, wherein:
the received content comprises clean type content or non-clean type content,
a clean type content comprises unencrypted or unscrambled content, and
non-clean type content comprises encrypted or scrambled content.

3. The method of claim 2, wherein, if the received content is the non-clean type content, transforming the received content into the target content of the specific type suitable for the target DRM device comprises:
obtaining a key for decrypting the content; and
decrypting the content using the obtained key, to produce a clean content version of the content.

4. The method of claim 1, further comprising:
obtaining a revocation list identifying a revoked device; and
performing a revocation check for accessing the transformed content based on the revocation list.

5. A device comprising:
an interface configured to:
receive, at a device, content from a content source;
transmit transformed target content and generated common license to a target Digital Rights Management (DRM) device; and
a processor configured to:
obtain from at least one of the content source and an user interface of the device, information including rights of the received content and a content index indexing the received content;
perform an integrity check on the received content, in order to verify an integrity of the received content, using a security system;

determine that the received content is transmitted to an interoperable domain on the basis of a result of the integrity check indicating that the integrity of the received content is secured, transform the received content into a target content of a specific type suitable for the target DRM device that is joined to an interoperable domain based on determining the transmission to the interoperable domain, and generate a common license of the target content including the rights of the content in a predetermined format that can be used as an interoperable license within the interoperable domain, using the obtained information, wherein generating the common license of the target content comprises:

determining whether the content index included in the obtained information is the same as another content index of another content within the interoperable domain, and on determining that the content index included in the contained information is the same as the another content index, requesting at least one of the content source and the user interface to transmit a new content index.

6. The device of claim 5, wherein:
the received content comprises clean type content or non-clean type content,
a clean type content comprises unencrypted or unscrambled content, and
non-clean type content comprises encrypted or scrambled content.

7. The device of claim 6, wherein, if the received content is the non-clean type content, transforming the received content into the target content of the specific type suitable for the target DRM device comprises:
obtaining a key for decrypting the content; and
decrypting the content using the obtained key, to produce a clean content version of the content.

8. The device of claim 5, wherein the processor is further configured to:
obtain a revocation list identifying a revoked device; and
perform a revocation check for accessing the transformed content based on the revocation list.

9. A system comprising:
one or more computers; and
a computer-readable medium coupled to the one or more computers having instructions stored thereon which, when executed by the one or more computers, causes the one or more computers to perform operations comprising:
receiving, at a device, content from a content source;
obtaining from at least one of the content source and an user interface of the device, information including rights of the received content and a content index indexing the received content;
performing an integrity check on the received content, in order to verify an integrity of the received content, using a security system;
determining that the received content is transmitted to an interoperable domain on the basis of a result of the integrity check indicating that the integrity of the received content is secured;
transforming the received content into a target content of a specific type suitable for a target Digital Rights Management (DRM) device that is joined to an interoperable domain based on determining the transmission to the interoperable domain;
generating a common license of the target content including the rights of the content in a predetermined format that can be used as an interoperable license within the interoperable domain, using the obtained information; and transmitting the transformed target content and generated common license to the target DRM device, wherein generating the common license of the target content comprises:

determining whether the content index included in the obtained information is the same as another content index of another content within the interoperable domain, and on determining that the content index included in the contained information is the same as the another content index, requesting at least one of the content source and the user interface to transmit a new content index.

10. The system of claim 9, wherein:

the received content comprises clean type content or non-clean type content, a clean type content comprises unencrypted or unscrambled content, and non-clean type content comprises encrypted or scrambled content.

11. The system of claim 10, wherein, if the received content is the non-clean type content, transforming the received content into the target content of the specific type suitable for the target DRM device comprises:

obtaining a key for decrypting the content; and decrypting the content using the obtained key, to produce a clean content version of the content.

12. The system of claim 9, wherein the operations further comprise:

obtaining a revocation list identifying a revoked device; and performing a revocation check for accessing the transformed content based on the revocation list.

* * * * *

UNITED STATES PATENT AND TRADEMARK OFFICE
CERTIFICATE OF CORRECTION

| | | |
|---|---|---|
| PATENT NO. | : 8,291,508 B2 | Page 1 of 1 |
| APPLICATION NO. | : 12/295868 | |
| DATED | : October 16, 2012 | |
| INVENTOR(S) | : Pak et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 237 days.

Signed and Sealed this
Twenty-sixth Day of August, 2014

Michelle K. Lee
*Deputy Director of the United States Patent and Trademark Office*